(12) United States Patent
Fiterman et al.

(10) Patent No.: US 9,669,936 B1
(45) Date of Patent: Jun. 6, 2017

(54) AIRCRAFT AIR CONDITIONING SYSTEMS AND METHODS

(71) Applicant: The Boeing Company, Seal Beach, CA (US)

(72) Inventors: Charles J. Fiterman, Mukilteo, WA (US); Warren A. Atkey, Bothell, WA (US)

(73) Assignee: The Boeing Company, Chicago, IL (US)

( * ) Notice: Subject to any disclaimer, the term of this patent is extended or adjusted under 35 U.S.C. 154(b) by 1391 days.

(21) Appl. No.: 13/659,897

(22) Filed: Oct. 24, 2012

(51) Int. Cl.
*B64D 13/02* (2006.01)
*B64D 13/06* (2006.01)

(52) U.S. Cl.
CPC ...... *B64D 13/06* (2013.01); *B64D 2013/0618* (2013.01); *B64D 2013/0648* (2013.01); *B64D 2013/0662* (2013.01)

(58) Field of Classification Search
CPC ............ B64D 13/06; B64D 2013/0648; B64D 2013/0662; B64D 13/08; B64D 2013/0618
USPC ......................................... 454/71; 244/118.5
See application file for complete search history.

(56) References Cited

U.S. PATENT DOCUMENTS

| | | | |
|---|---|---|---|
| 2,734,356 A * | 2/1956 | Kleinhans | B64D 13/04 454/73 |
| 2,777,301 A | 1/1957 | Kuhn | |
| 4,419,926 A * | 12/1983 | Cronin | B64D 13/06 237/11 |
| 4,684,081 A | 8/1987 | Cronin | |
| 5,442,905 A * | 8/1995 | Claeys | B64D 13/06 454/71 |
| 5,482,229 A | 1/1996 | Asshauer | |
| 5,813,630 A | 9/1998 | Williams | |
| 5,911,388 A * | 6/1999 | Severson | B64D 13/06 244/118.5 |
| 5,918,472 A * | 7/1999 | Jonqueres | B64D 13/06 62/172 |
| 5,967,461 A * | 10/1999 | Farrington | B64D 13/06 244/118.5 |
| 6,041,615 A * | 3/2000 | Ostersetzer | B64D 13/06 62/402 |
| 6,449,963 B1 * | 9/2002 | Ng | B64D 13/06 454/71 |
| 6,526,775 B1 * | 3/2003 | Asfia | B64D 13/06 62/401 |

(Continued)

*Primary Examiner* — Steven B McAllister
*Assistant Examiner* — Frances F. Hamilton

(57) ABSTRACT

There are provided aircraft air conditioning systems and methods. The aircraft air conditioning system has a duct in an aircraft connected to an aircraft cabin and configured to flow pressurized cabin outflow air from the aircraft cabin. The aircraft air conditioning system further has a turbine connected to the duct and configured to reduce a temperature of the pressurized cabin outflow air and to generate power, and further has a compressor configured to generate a compressed inlet air stream, and further has an air conditioning pack configured to receive a reduced temperature cabin outflow air from the turbine and configured to receive the compressed inlet air stream from the compressor. The air conditioning pack has a cooling cycle system, a humidity control system, and one or more heat exchangers configured to use the reduced temperature cabin outflow air as a heat sink.

22 Claims, 14 Drawing Sheets

(56) References Cited

U.S. PATENT DOCUMENTS

| | | | | |
|---|---|---|---|---|
| 6,615,606 B2* | 9/2003 | Zywiak | ............... | B64D 13/06 62/402 |
| 7,121,100 B2* | 10/2006 | Atkey | ............... | B64D 13/06 62/172 |
| 7,578,136 B2* | 8/2009 | Derouineau | ............... | B64D 13/02 62/172 |
| 2004/0014420 A1* | 1/2004 | Bruno | ............... | B64D 13/06 454/237 |
| 2008/0090510 A1* | 4/2008 | Scherer | ............... | B64D 13/06 454/71 |
| 2008/0110193 A1* | 5/2008 | Jonqueres | ............... | B64D 13/06 62/331 |
| 2011/0107777 A1 | 5/2011 | Atkey et al. | | |

* cited by examiner

AIRCRAFT AIR CONDITIONING SYSTEMS AND METHODS

BACKGROUND

1) Field of the Disclosure

The disclosure relates generally to air conditioning systems and methods, and more particularly, to air conditioning systems and methods for pressurized aircraft that provide increased air conditioning system efficiency through reduction in power usage, as well as expanded air conditioning system capability at high aircraft speeds.

2) Description of Related Art

A primary function of aircraft air conditioning and thermal management systems is to transfer heat away from aircraft equipment, aircraft occupants, and aircraft interior compartments, such as the passenger cabin, cargo holds, and other interior compartments. In removing such heat, the aircraft air conditioning and thermal management systems typically require a heat sink to transfer the heat energy to. Possible heat sinks offering the capacity commensurate to the aircraft air conditioning and thermal management system's need may include ram air, aircraft surfaces (e.g., skin or structure), or fuel. As aircraft speed increases, the ram air and skin temperatures may also increase. Consequently, at higher speeds (in excess of Mach 1.0), such heat sinks may become less effective. Thus, known high speed or supersonic aircraft have used fuel as the heat sink during high speed operation.

However, recent regulatory requirements and industry focus associated with aircraft fuel tank flammability may make the use of fuel as a heat sink for these functions no longer viable or an optimal design solution. Given such limitations, air conditioning and pressurization of high speed commercial aircraft may become more challenging, and may result in added cost, complexity, weight, and inefficiency.

In addition, a primary function of an aircraft air conditioning system is to provide outside air for ventilation, pressurization, and thermal management. A significant amount of energy may be required to bring outside air into a pressurized aircraft during cruise, where ambient pressures are low. Some of this energy may be recovered as thrust via cabin outflow devices.

Aircraft air conditioning and pressurization systems are typically the largest continuous secondary power users on a commercial aircraft, with aircraft propulsion being the primary power user. Providing power for such aircraft air conditioning and pressurization systems, in addition to the other secondary power users, may prove to be a design challenge for propulsion engines (the power source) and secondary power load management controls. Aircraft secondary power may be extracted through pneumatic power (engine bleed air), electrical power (shaft driven generators), and hydraulic power (via shaft driven pumps, augmented by pneumatic driven pumps). However, such pneumatic and electrical power sources may have limits, and the extraction of power from such sources may need to be managed to ensure critical limits are not exceeded. Moreover, secondary power extraction limitations, whether pneumatic or electrical power, may result in inadequate cooling. Further, in order to improve engine efficiency and operability, secondary power extraction may be limited. As aircraft cooling demands increase beyond the levels that may be accommodated with available secondary power levels, the aircraft thermal environment may be degraded. Such aircraft cooling demands may not be satisfied with known aircraft architecture without additional secondary power. However, satisfying this need may adversely impact known aircraft systems.

Thus, as engine developments become more efficient and the available secondary power reduces, the use of cabin energy during flight may be beneficial in supplementing any power deficiencies. Accordingly, there is a need for an improved aircraft air conditioning system and method that provides advantages over known systems and methods.

SUMMARY

This need for an improved aircraft air conditioning system and method is satisfied. As discussed in the below detailed description, embodiments of such improved aircraft air conditioning system and method may provide significant advantages over existing systems and methods.

In one embodiment there is provided an aircraft air conditioning system. The aircraft air conditioning system comprises a duct in an aircraft connected to an aircraft cabin and configured to flow pressurized cabin outflow air from the aircraft cabin. The aircraft air conditioning system further comprises a turbine connected to the duct and configured to reduce a temperature of the pressurized cabin outflow air and to generate power. The aircraft air conditioning system further comprises a compressor configured to generate a compressed inlet air stream. The aircraft air conditioning system further comprises an air conditioning pack configured to receive a reduced temperature cabin outflow air from the turbine and configured to receive the compressed inlet air stream from the compressor. The air conditioning pack comprises a cooling cycle system, a humidity control system, and one or more heat exchangers configured to use the reduced temperature cabin outflow air as a heat sink.

In another embodiment there is provided an aircraft having an aircraft air conditioning system providing expanded air conditioning and thermal management performance. The aircraft comprises a fuselage and an aircraft cabin disposed within the fuselage. The aircraft further comprises an aircraft air conditioning system disposed within the fuselage. The aircraft air conditioning system comprises a duct connected to the aircraft cabin and configured to flow pressurized cabin outflow air from the aircraft cabin. The aircraft air conditioning system further comprises a turbine connected to the duct. The turbine is configured to reduce a temperature of the pressurized cabin outflow air and to generate power. The aircraft air conditioning system further comprises a compressor configured to generate a compressed inlet air stream. The aircraft air conditioning system further comprises an air conditioning pack configured to receive a reduced temperature cabin outflow air from the turbine and configured to receive the compressed inlet air stream from the compressor. The air conditioning pack comprises a cooling cycle system, a humidity control system, and one or more heat exchangers configured to use the reduced temperature cabin outflow air as a heat sink.

In another embodiment there is provided a method for air conditioning an aircraft. The method comprises flowing a pressurized cabin outflow air from an aircraft cabin to a turbine via a duct in an aircraft. The method further comprises extracting energy from the pressurized cabin outflow air via the turbine to generate a reduced temperature cabin outflow air and power. The method further comprises using the power from the turbine to power in whole or in part a compressor. The method further comprises using the compressor to generate a compressed inlet air stream. The method further comprises flowing the reduced temperature outflow air and the compressed inlet air stream into an air conditioning pack. The air conditioning pack comprises a cooling cycle system, a humidity control system, and one or more heat exchangers configured to use the reduced temperature cabin outflow air as a heat sink.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
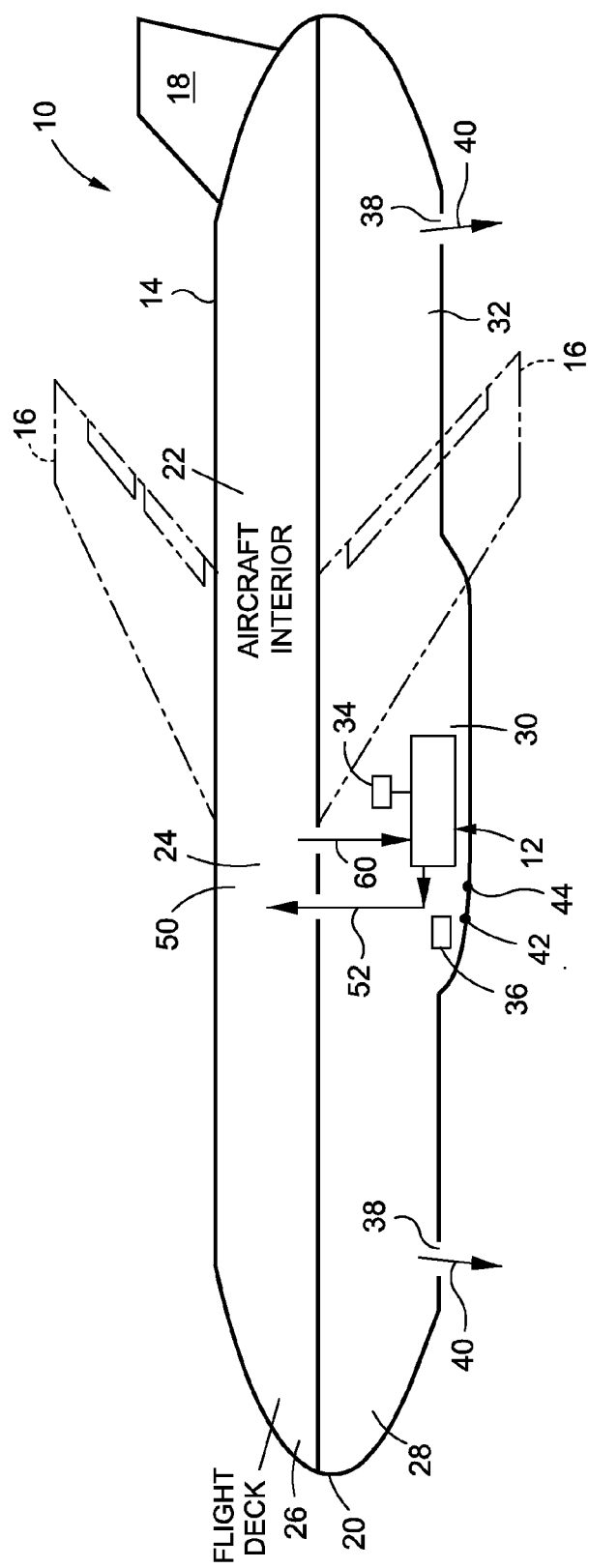
FIG. 1 is an illustration of a schematic diagram of an aircraft having one of the embodiments of an aircraft air conditioning system of the disclosure.

Now referring to the Figures, FIG. 1 is an illustration of a schematic diagram of an aircraft 10 having one of the embodiments of an aircraft air conditioning system 12 of the disclosure. As shown in FIG. 1, the aircraft 10 may comprise a fuselage 14, a pair of wings 16, a tail 18, and a nose 20. The fuselage 14 defines an aircraft interior 22 (see FIG. 1). As further shown in FIG. 1, the aircraft interior 22 may comprise an aircraft cabin 24 preferably for passengers or cargo, a flight deck 26 preferably for pilots or other flight crew members, a forward bay 28, a pack bay 30, an aft bay 32, and/or other suitable bays or compartments. As further shown in FIG. 1, the aircraft 10 may further comprise one or more aircraft engine compressors 34, one or more aircraft subsystems 36, one or more leakage and outflow air valves 38 for allowing leakage and outflow air 40 to flow out of the aircraft 10, and first external inlet 42 and second external inlet 44. The aircraft 10, including the aircraft cabin 24, is pressurized. The aircraft cabin 24 comprises cabin air 50 (see FIG. 1) that is preferably pressurized.

FIGS. 2-9 are illustrations of schematic diagrams of various embodiments of the aircraft air conditioning system 12 of the disclosure. The specific application of each embodiment may depend on the aircraft architecture and design considerations, such as, for example, whether the aircraft has a high design speed, whether secondary power is limited, whether aircraft level benefits may be obtained by using cold turbine exhaust air for thermal management, or other design considerations.

Figure 2:
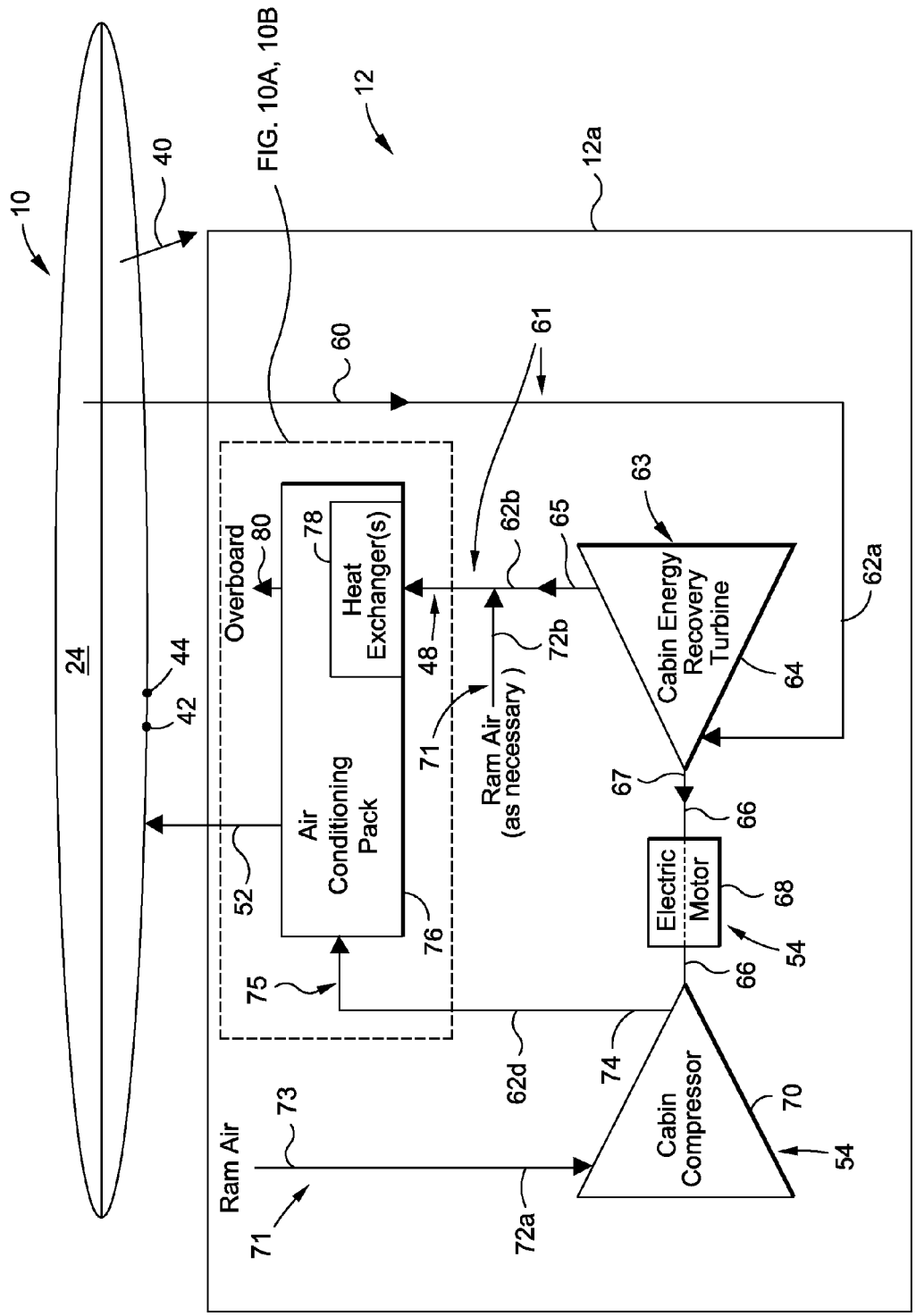
FIG. 2 is an illustration of a schematic diagram of one of the embodiments of an aircraft air conditioning system of the disclosure having a turbine that generates power to an electric motor and a cabin compressor that pressurizes ram air.

FIG. 2 is an illustration of a schematic diagram of one of the embodiments of an aircraft air conditioning system 12, such as in the form of an aircraft air conditioning system 12a. As shown in FIG. 2 and FIG. 11B, the aircraft air conditioning system 12, such as in the form of aircraft air conditioning system 12a, comprises a duct system 61 having a duct 62a, or at least one duct 62a, connected to the aircraft cabin 24 of the aircraft 10. As shown in FIG. 2, the duct system 61 further comprises duct 62b. As further shown in FIG. 2 and FIG. 11A, the aircraft air conditioning system 12, such as in the form of aircraft air conditioning system 12a, further comprises a turbine 63 connected to the at least one duct 62a. The turbine 63 is preferably a cabin energy recovery turbine 64 (see FIG. 2). The turbine 63 is connected to the duct 62a and is configured to reduce a temperature of a pressurized cabin outflow air 60 and to generate power 67 (see FIGS. 2, 11A-11B). The at least one duct 62a flows the pressurized cabin outflow air 60 from the aircraft cabin 24 to the turbine 63. The turbine 63 receives the pressurized cabin outflow air 60 and expands the pressurized cabin outflow air 60 through the turbine 63. The turbine 63 generates a lower temperature air flow than the higher pressure inlet air flow, as the turbine 63 extracts an extracted energy 77 (see FIG. 11A) from the airstream of pressurized cabin outflow air 60 and effectively reduces its temperature. Such lower temperature airstream of pressurized cabin outflow air 60 is hereinafter termed "turbine outflow air" 65 (see FIGS. 2 and 11B). The turbine 63 also generates power 67 (see FIGS. 2 and 11A) from the extracted energy 77 (see FIG. 11A) extracted from the pressurized cabin outflow air 60. The turbine outflow air 65 is preferably at a temperature of less than freezing, i.e., less than 32 degrees Fahrenheit. Further, depending on the altitude of the aircraft 10 and the desired output pressure and temperature of the aircraft cabin 24, the turbine outflow air 65 may be at a temperature in a range of from about −10 (minus ten) degrees Fahrenheit to about −50 (minus fifty) degrees Fahrenheit.

As further shown in FIG. 2 and FIG. 11B, the aircraft air conditioning system 12, such as in the form of aircraft air conditioning system 12a, further comprises at least one shaft 66 connected to the turbine 63. Preferably, the shaft 66 is a mechanical shaft that is capable of rotating or turning. The shaft 66 is preferably driven by the power 67 generated from the turbine 63. The power 67 preferably comprises shaft horsepower or another suitable power or energy. The shaft 66 is configured to generate energy to power one or more aircraft air conditioning system components 54 (see FIG. 2) and/or aircraft subsystems 36 (see FIG. 6). For example, the driving of the shaft 66 using the power 67 generated from the turbine 63 may be used to directly power or augment the power supplied to the air conditioning system components 54 and/or the aircraft subsystems 36.

Figure 11A:
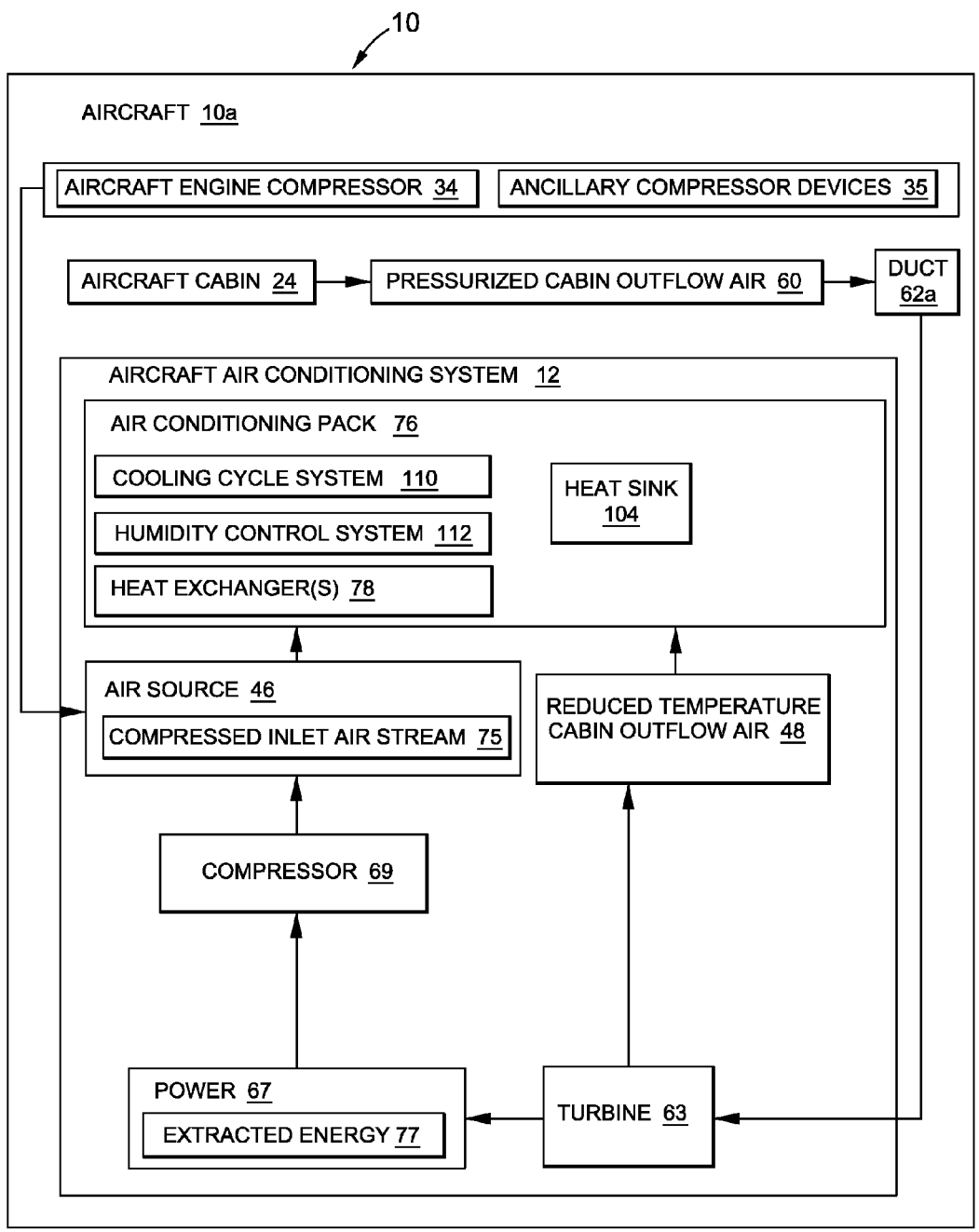
FIG. 11A is an illustration of a functional block diagram of one of the embodiments of an aircraft of the disclosure.
Figure 11B:
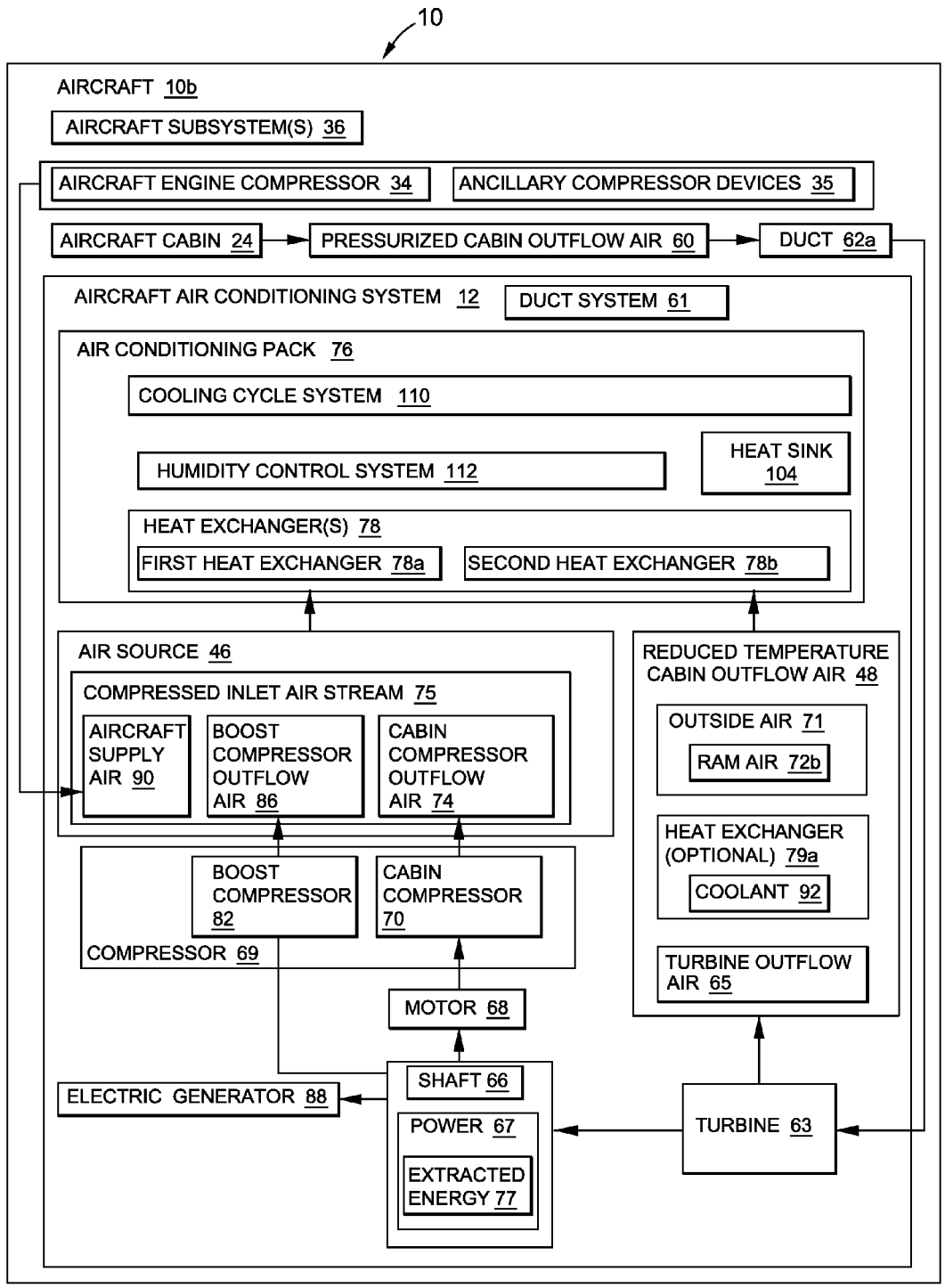
FIG. 11B is an illustration of a functional block diagram of another embodiment of an aircraft of the disclosure; and, FIG. 12 is an illustration of a flow diagram showing an embodiment of a method of the disclosure.

As further shown in FIG. 2 and FIG. 11A, the aircraft air conditioning system 12, such as in the form of aircraft air conditioning system 12a, further comprises a compressor 69 configured to generate a compressed inlet air stream 75. The shaft 66 connects the turbine 63 to the compressor 69 (see FIG. 11A), such as the cabin compressor 70 (see FIG. 2), and the shaft 66 is configured to turn the compressor 69, such as the cabin compressor 70, when the pressurized cabin outflow air 60 passes through the turbine 63. In the embodiment shown in FIG. 2, the one or more aircraft air conditioning system components 54 of the aircraft air conditioning system 12 may comprise a cabin compressor 70 that uses ram air 72a and an electric motor 68. In this embodiment, the shaft 66 connects the turbine 63 to the compressor 69 (see FIG. 11A), such as cabin compressor 70, and to an electric motor 68 therebetween. The shaft 66 is configured to turn the compressor 69 (see FIG. 11A), such as the cabin compressor 70, when the pressurized cabin outflow air 60 passes through the turbine 63 and the electric motor 68 configured to turn the shaft 66.

The electric motor 68 provides energy to power the cabin compressor 70. Both the cabin compressor 70 and the electric motor 68 may be connected to the shaft 66. In a preferred embodiment, the electric motor 68 is attached on the shaft 66 (see FIG. 2), and when the turbine 63 extracts the extracted energy 77 (see FIG. 11A) from the pressurized cabin outflow air 60, the turbine 63 generates power 67, such as in the form of shaft horsepower, to drive the shaft 66 and augment the power from the electric motor 68 that powers the cabin compressor 70.

Figure 3:
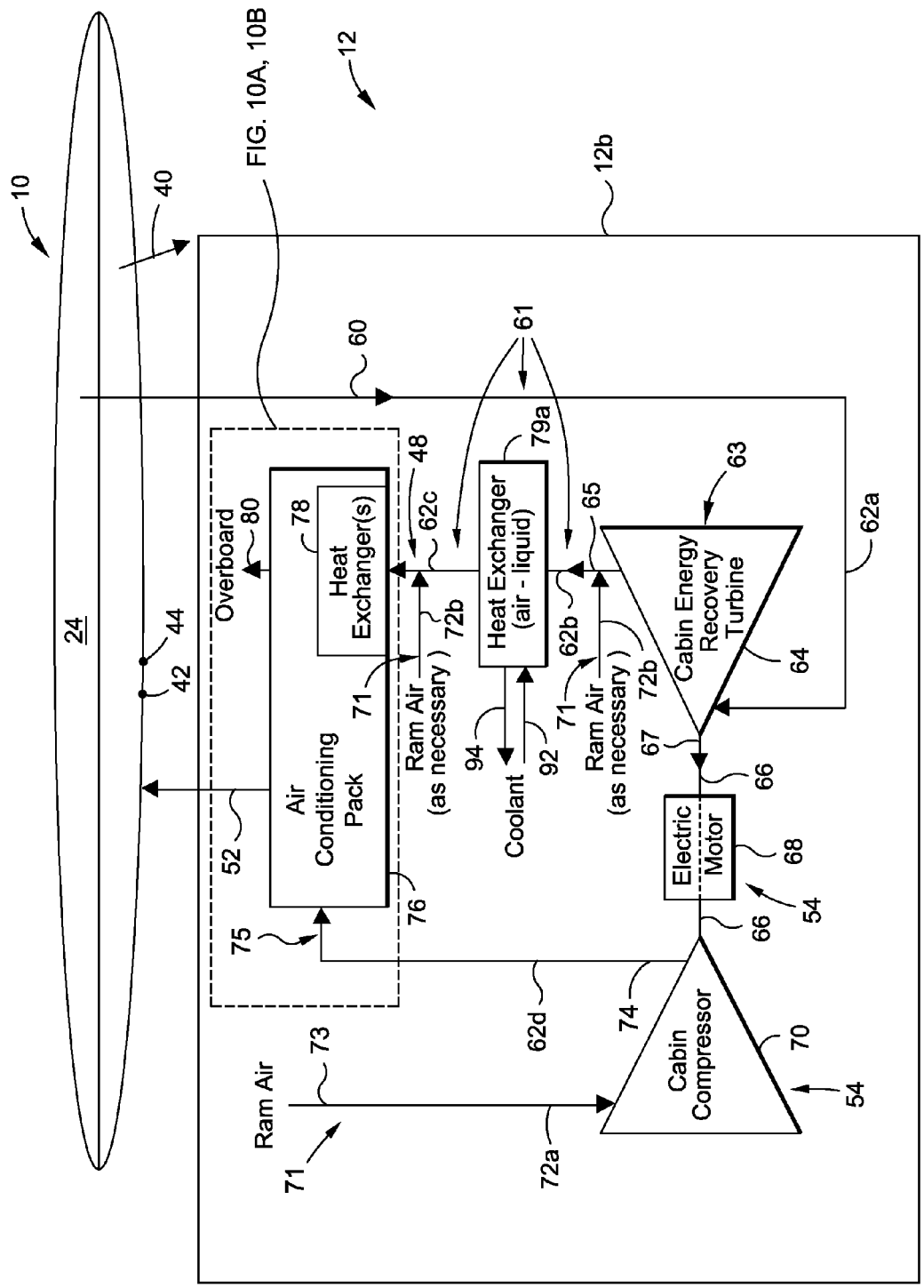
FIG. 3 is an illustration of a schematic diagram of another one of the embodiments of an aircraft air conditioning system of the disclosure having a turbine that generates power to an electric motor and a cabin compressor that pressurizes ram air.

For purposes of this application, "ram air" refers to ambient air or air flow (i.e., air outside of the aircraft) created by movement of the aircraft 10 (see FIG. 1) itself, where the aircraft may intake such ambient or outside air or air flow in place of ducting air from aircraft engines to aid in aircraft engine performance and cabin cooling. For example, as shown in FIGS. 2, 3 and 8, ram air 72a and ram air 72b, may be pulled from an ambient air source 71 or outside air source, and the ambient air source 71 or outside air source may be pulled or drawn in through external inlets 42, 44 (see FIGS. 1, 2, 3, and 8) on the fuselage 14 (see FIG. 1) of the aircraft 10. Moreover, as shown in the embodiments in FIGS. 4-7 and 9, ram air 72b, may similarly be pulled from an ambient air source 71 or outside air source, and the ambient air source 71 or outside air source may be pulled or drawn in through external inlets 42, 44 (see FIGS. 1, 2, 3, and 8) on the fuselage 14 (see FIG. 1) of the aircraft 10. Such external inlets 42, 44 (see FIGS. 1, 2, 3, and 8) are merely examples of possible inlets that the ambient air source 71 from which the ram air 72a and/or ram air 72b may be drawn through and are not intended to be limited to these external inlets on the aircraft 10. The external or ram air inlets may be located on or in various other locations on the aircraft 10 as well.

As shown in FIG. 2, a ram air duct 73 is connected to the cabin compressor 70. The ram air duct 73 may supply ram air 72a to the cabin compressor 70 from the external inlets 42, 44 (see FIGS. 1, 2) or another inlet on the aircraft 10 (see FIGS. 1, 2). The external inlets 42, 44 shown in FIGS. 1 and 2 are examples and may comprise external ram air inlets positioned on underbelly portions of the fuselage 14 (see FIG. 1) of the aircraft 10 and configured for intake of ram air 72a into the aircraft 10 and through the ram air duct 73. Alternatively, the external inlets 42, 44 may be positioned on a lower portion of a wing box (not shown) underneath the wings 16 (see FIG. 1), on an upper front portion of the engines (not shown) of the aircraft 10, on another outer wall or skin surface of the aircraft 10, or on another suitable external surface of the aircraft 10. The cabin compressor 70 pressurizes the ram air 72a to the required pressure of the aircraft 10, thereby reducing the amount of power required by the aircraft engines to run the cabin compressor 70. Thus, the aircraft air conditioning system 12, such as in the form of aircraft air conditioning system 12a (see FIG. 2), augments the electrical power and may achieve the required performance of the aircraft 10 without having to increase the electrical power generation and distribution systems to the aircraft 10. The aircraft air conditioning system 12, such as in the form of aircraft air conditioning system 12a, shown in FIG. 2, uses ram air 72a and an electric motor 68, and is thus a ram air 72a electric-based system. The power 67 generated from the turbine 63, such as a turbine in the form of the cabin energy recovery turbine 64, may thus be used to augment power to the electrically driven cabin compressor 70. The cabin compressor 70 may be powered in whole or in part by the turbine 63. The ram air 72a may be compressed in the cabin compressor 70 and may generate a cabin compressor discharge air 74 that flows through duct 62d (see FIG. 2) into an air conditioning pack 76 (see FIG. 2) as an air source 46 (see FIG. 11A), such as a compressed inlet air stream 75 (see FIG. 2) for cooling and conditioning in the air conditioning pack 76 prior to being delivered into the aircraft cabin 24. Thus, as shown in FIG. 2, where the compressor 69 (see FIG. 11A) is a cabin compressor 70 connected to a ram air duct 73, the cabin compressor 70 may be configured to receive ram air 72a from an ambient air source 71 and configured to compress and flow the ram air 72a as the compressed inlet air stream 75 to the air conditioning pack 76.

As further shown in FIG. 2, the turbine outflow air 65 generated by the turbine 63 may be mixed with an ambient air source (e.g., outside air) 71, such as in the form of ram air 72b, as necessary, to reduce mass flow of the ambient air source 71, such as in the form of ram air 72b, thus minimizing any associated ram system drag on the aircraft 10. The turbine outflow air 65 may be mixed with the ambient air source 71, such as in the form of ram air 72b, to act as a heat sink, such as a cold heat sink, for the aircraft air conditioning system 12, such as in the form of aircraft air conditioning system 12a. The addition of the turbine outflow air 65 to the ambient air source 71, such as in the form of ram air 72b, may also provide the necessary heat sink capacity at high aircraft speeds (beyond Mach 1.0) for high speed or supersonic aircraft or lower secondary power available conditions, as high speed or supersonic aircraft typically have much hotter ram air than subsonic aircraft. A reduced temperature cabin outflow air 48 (see FIG. 2) may comprise the turbine outflow air 65 mixed with the ambient air source (e.g., outside air) 71, such as in the form of ram air 72b.

As further shown in FIG. 2 and FIG. 11A, the aircraft air conditioning system 12, such as in the form of aircraft air conditioning system 12a, comprises an air conditioning pack 76. The air conditioning pack 76 preferably comprises a cooling cycle system 110 (see FIG. 11A), a humidity control system 112 (see FIG. 11A), and one or more heat exchanger (s) 78 (see FIG. 11A) configured to use the reduced temperature cabin outflow air 48 as a heat sink 104 (see FIG. 11A). As used herein, the term "heat sink" means a medium, such as a heat exchanger, that transfers thermal energy from a higher temperature to a lower temperature fluid medium, i.e., that absorbs heat. In particular, for embodiments of the aircraft air conditioning system 12 disclosed herein, for example, when a hot or warm air flow or another fluid on one side of a heat exchanger transfers heat to a colder air flow, such as ram air 72b (see FIG. 2) and/or reduced temperature cabin outflow air 48 (see FIG. 2), the colder air flow, such as the ram air 72b (see FIG. 2) and/or the reduced temperature cabin outflow air 48 (see FIG. 2), acts as the heat sink 104 (see FIG. 11A). The one or more heat exchanger(s) 78 are configured to use the reduced temperature cabin outflow air 48 as a heat sink 104 (see FIG. 11A). The air conditioning pack 76 preferably comprises one or more heat exchangers 78. As shown in FIG. 11A, the one or more heat exchangers may comprise ram air heat exchangers, such as in the form of a first heat exchanger 78a and a second heat exchanger 78b. The first heat exchanger 78a may be configured to aid in reducing heat of the compressed inlet air stream 75 using the reduced temperature cabin outflow air 48. The second heat exchanger 78b may be configured to aid in reducing heat of at least one transport fluid 108 (see FIGS. 10A-10B) flowing through the air conditioning pack 76.

Preferably, the air conditioning pack 76 with the one or more heat exchangers 78 is connected to the turbine 63 via at least one duct 62b (see FIG. 2). The one or more heat exchangers 78 may preferably be connected to the air conditioning pack 76 and may preferably be within the air conditioning pack 76. The turbine outflow air 65 that is mixed with the ambient air source (e.g., outside air) 71, such as in the form of ram air 72b (see FIG. 2), comprises the reduced temperature cabin outflow air 48 that preferably flows through the duct 62b and is received by the air conditioning pack 76, and is preferably received by the one or more heat exchangers 78. The reduced temperature cabin outflow air 48 may be conditioned through the air conditioning pack 76 and may be used to cool the compressed inlet air stream 75. After having been used as a heat exchanger heat sink, the outflow air stream may then flow overboard as an exhaust outflow air 80. The compressed inlet air stream 75, such as in the form of cabin compressor discharge air 74, is preferably received, cooled, and conditioned by the air conditioning pack 76. The reduced temperature cabin outflow air 48 may aid the air conditioning pack 76 in cooling the cabin compressor discharge air 74. The air conditioning pack 76 may be configured to change the temperature and the flow rate of the compressed inlet air stream 75, such as in the form of cabin compressor discharge air 74. From the cooled and conditioned compressed inlet air stream 75, the air conditioning pack 76 may generate a conditioned outflow air 52 that then flows to the aircraft cabin 24. The air conditioning pack 76 is configured to provide the conditioned outflow air 52 to the aircraft cabin 24 to meet temperature, pressure, and air conditioning needs. The conditioned outflow air 52 (see FIGS. 1, 2) may flow into the aircraft cabin 24 and mix with the cabin air 50 (see FIG. 1). Leakage and outflow air 40 (see FIGS. 1, 2) may flow through the leakage and outflow air valves 38 (see FIG. 1) and out of the aircraft 10.

As used herein, the term "air conditioning pack" means a device or system that conditions pressurized air intended to be supplied to an aircraft, where the pressurized air is conditioned for temperature via a cooling cycle system, and where the pressurized air is conditioned for humidity via a humidity control system, such as with water condensing and extraction devices. The air conditioning pack 76 used in embodiments of the air conditioning system 12 disclosed herein provides pressurization, ventilation and temperature and humidity control to the aircraft throughout the aircraft's entire operation, including at sea level and at cruise level. Further, the air conditioning pack 76 used in embodiments of the air conditioning system 12 disclosed herein facilitates the ability to have an entirely stand alone air conditioning system integrated with a turbine 63, such as a cabin energy recovery turbine 64, to provide an improved cooling heat sink as required. Further, the term "air conditioning pack" used herein means known mechanical components used as part of an air conditioning thermodynamic cycle, and should not be construed as limited to the embodiments set forth herein. For example, any or all of the components shown in FIGS. 2-9 positioned outside of or external to the air conditioning pack 76 may be packaged within or internal to the air conditioning pack 76, depending on the desired application. Whether the components of embodiments of the air conditioning system 12 disclosed herein are packaged outside of or inside of the air conditioning pack 76 is not intended to be limiting.

FIG. 11A is an illustration of a functional block diagram of one of the embodiments of an aircraft 10a that may include embodiments of the air conditioning system 12 with the air conditioning pack 76. FIG. 11B is an illustration of a functional block diagram of another embodiment of an aircraft 10b that may include embodiments of the air conditioning system 12 with the air conditioning pack 76. As shown in FIGS. 11A-11B, the air conditioning pack 76 used in embodiments of the air conditioning system 12 disclosed herein may comprise one or more heat exchanger(s) 78, and preferably may comprise two heat exchangers 78, such as in the form of first heat exchanger 78a and second heat exchanger 78b. The air conditioning pack 76 may further comprise a cooling cycle system 110 and a humidity control system 112. Although two heat exchangers 78a, 78b are shown in FIGS. 11A-11B, the air conditioning pack 76 used with embodiments of the air conditioning system 12 disclosed herein may have one, three, four, five, or more heat exchangers and is not limited to the disclosed embodiments.

Figure 10A:
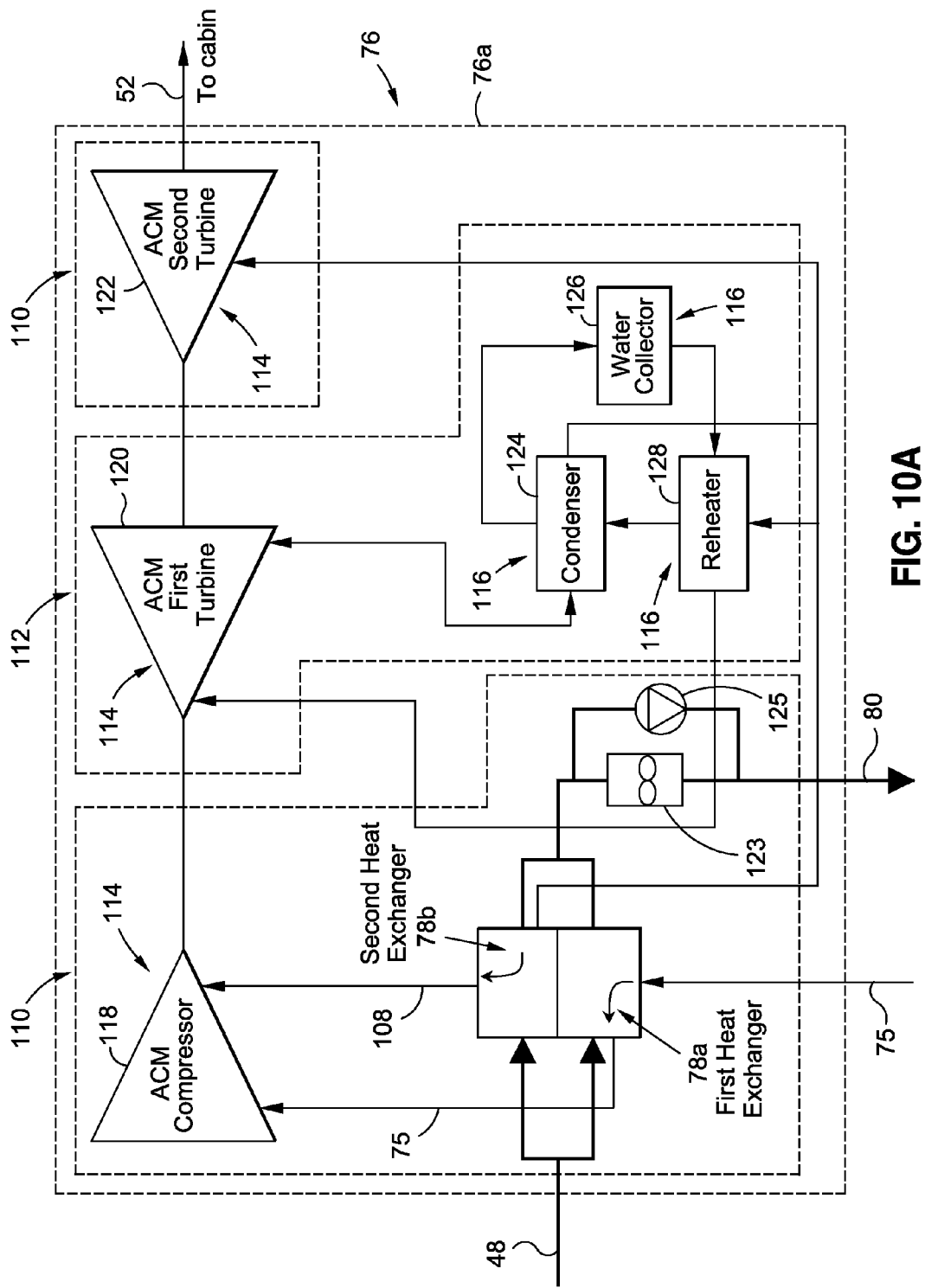
FIG. 10A is an illustration of a schematic diagram of one of the embodiments of an air conditioning pack that may be used in embodiments of the air conditioning system of the disclosure.

The air conditioning pack 76 used in embodiments of the air conditioning system 12 disclosed herein may comprise known aircraft air conditioning packs containing mechanical components known in the art. An exemplary embodiment of the air conditioning pack 76, such as in the form of an air cycle machine system air conditioning pack 76a, that may be used with embodiments of the air conditioning system 12 disclosed herein is shown in FIG. 10A. FIG. 10A is an illustration of a schematic diagram of the air cycle machine system air conditioning pack 76a that may be used in embodiments of the air conditioning system 12 of the disclosure.

Figure 10B:
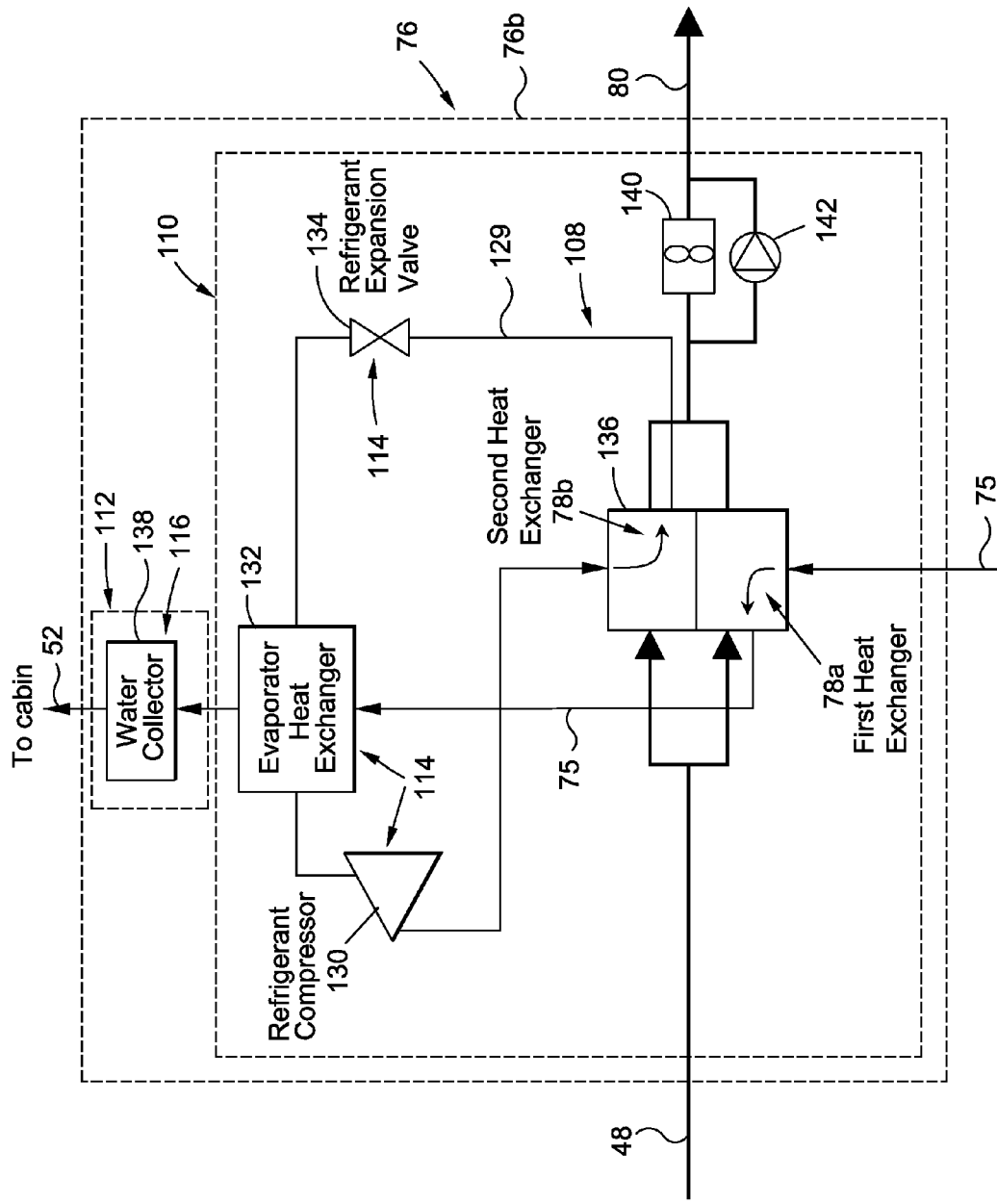
FIG. 10B is an illustration of a schematic diagram of another embodiment of an air conditioning pack that may be used in embodiments of the air conditioning system of the disclosure.

Another exemplary embodiment of the air conditioning pack 76, such as in the form of a refrigerant vapor cycle system air conditioning pack 76b, that may be used with embodiments of the air conditioning system 12 disclosed herein is shown in FIG. 10B. FIG. 10B is an illustration of a schematic diagram of the refrigerant vapor cycle system air conditioning pack 76b that may be used in embodiments of the air conditioning system 12 of the disclosure. The air conditioning packs 76 shown in FIGS. 10A and 10B are merely examples of air conditioning packs 76 that may be used with embodiments of the air conditioning system 12 disclosed herein and are not meant to be limiting and should not be construed as limited to these embodiments. Rather, other air conditioning packs containing mechanical components known in the art may be used in embodiments of the air conditioning system 12 disclosed herein.

As shown in FIG. 10A, the air conditioning pack 76, in the form of the exemplary air cycle machine system air conditioning pack 76a, comprises a first heat exchanger 78a, a second heat exchanger 78b, a transport fluid 108, a cooling cycle system 110, and a humidity control system 112. The air cycle machine system air conditioning pack 76a does not contain a refrigerant. As shown in FIG. 10A, the reduced temperature cabin outflow air 48 (see also FIGS. 2-9) is received by the air cycle machine system air conditioning pack 76a and flows into the first heat exchanger 78a and the second heat exchanger 78b. Preferably, the first heat exchanger 78a is a primary heat exchanger and the second heat exchanger 78b is a secondary heat exchanger. The second heat exchanger 78b is configured to cool the transport fluid 108. The transport fluid 108 preferably comprises the cooled air itself flowing from the second heat exchanger 78b through the air cycle machine system air conditioning pack 76a. The transport fluid 108 flows from the second heat exchanger 78b to the cooling cycle system 110.

As further shown in FIG. 10A, the compressed inlet air stream 75 (see also FIGS. 2-9) is also received by the air cycle machine system air conditioning pack 76a and flows into the first heat exchanger 78a. The first heat exchanger 78a is preferably configured to cool the compressed inlet air stream 75 using the reduced temperature cabin outflow air 48. The cooled compressed inlet air stream 75 flows from the first heat exchanger 78a to the cooling cycle system 110.

As further shown in FIG. 10A, the cooling cycle system 110 may comprise one or more temperature control devices 114, a ram fan 123, one or more check valve 125, and various interconnection elements between these components. The cooling cycle system 110 may comprise the first heat exchanger 78a and/or the second heat exchanger 78b as well. With the air cycle machine system air conditioning pack 76a embodiment of the air conditioning pack 76, as shown in FIG. 10A, the temperature control devices 114 may include an ACM (air cycle machine) compressor 118 and an ACM second turbine 122. The ACM (air cycle machine) compressor 118 may comprise a turbomachine that is used to condition bleed air by compressing it in a first stage and then flowing it through a secondary heat exchanger, such as second heat exchanger 78b, and then flowing it through one or more of ACM first turbine 120 and ACM second turbine 122. The cooling cycle system 110 provides for a large turbine expansion cooling power within the air cycle machine system air conditioning pack 76a, and further provides for temperature control and conditioning of the air flowing through the cooling cycle system 110. The ram fan 123 may provide ram air flow across the first heat exchanger 78a and the second heat exchanger 78b when the aircraft 10 (see FIG. 1) is on the ground.

As further shown in FIG. 10A, the air cycle machine system air conditioning pack 76a further comprises a humidity control system 112 comprised of the ACM first turbine 120 and one or more water condensing and extraction devices 116. In this embodiment of the air cycle machine system air conditioning pack 76a, as shown in FIG. 10A, the water condensing and extraction devices 116 may include a condenser 124, a water collector 126, and a reheater 128. The humidity control system 112 provides for humidity control of the air flowing through the humidity control system 112 and efficiently removes moisture, such as water, from the conditioned air.

As shown in FIG. 10A, the conditioned outflow air 52 exits the air cycle machine system air conditioning pack 76a once it is cooled and conditioned and flows to the aircraft cabin 24. Further, as shown in FIG. 10A, after having been conditioned and/or used for cooling, the reduced temperature cabin outflow air 48 may then flow overboard as exhaust outflow air 80.

As shown in FIG. 10B, the air conditioning pack 76, in the form of the exemplary refrigerant vapor cycle system air conditioning pack air 76b, comprises a first heat exchanger 78a, a second heat exchanger 78b, a transport fluid 108 such as in the form of a refrigerant 129, a cooling cycle system 110, and a humidity control system 112. The refrigerant vapor cycle system air conditioning pack air 76b contains refrigerant 129 (see FIG. 10B), such as carbon dioxide, ammonia, or other suitable fluids capable of changes of phase. As shown in FIG. 10B, the reduced temperature cabin outflow air 48 (see also FIGS. 2-9) is received by the refrigerant vapor cycle system air conditioning pack air 76b and flows into the first heat exchanger 78a and the second heat exchanger 78b. Preferably, the first heat exchanger 78a is a primary heat exchanger for cabin side air and the second heat exchanger 78b is a condenser heat exchanger 136 (see FIG. 10B) for vapor side air. The second heat exchanger 78b is configured to cool the transport fluid 108 (see also FIGS. 11A-11B).

As further shown in FIG. 10B, the compressed inlet air stream 75 is also received by the refrigerant vapor cycle system air conditioning pack air 76b and flows into the first heat exchanger 78a. The first heat exchanger 78a is preferably configured to cool the compressed inlet air stream 75 using the reduced temperature cabin outflow air 48. The cooled compressed inlet air stream 75 flows from the first heat exchanger to the cooling cycle system 110. As shown in FIG. 10B, the cooling cycle system 110 may comprise one or more temperature control devices 114, a ram fan 140, one or more check valves 142, and various interconnection elements between these components. The cooling cycle system 110 may comprise the first heat exchanger 78a and/or the second heat exchanger 78b as well. In this embodiment of the refrigerant vapor cycle system air conditioning pack 76b, as shown in FIG. 10B, the temperature control devices 114 may include a refrigerant compressor 130, an evaporator heat exchanger 132, and a refrigerant expansion valve 134. The refrigerant vapor cycle system air conditioning pack air 76b may also include accumulators (not shown) or other mechanical components known in the art. The cooling cycle system 110 provides for temperature control and conditioning of the air flowing through the refrigerant vapor cycle system air conditioning pack air 76*b*.

As shown in FIG. 10B, the refrigerant vapor cycle system air conditioning pack air 76*b* further comprises a humidity control system 112 having water condensing and extraction devices 116. In this embodiment of the refrigerant vapor cycle system air conditioning pack air 76*b*, as shown in FIG. 10B, the water condensing and extraction devices 116 may include a water collector 138 and the condenser heat exchanger 136. The humidity control system 112 provides for humidity control and efficiently removes moisture such as water from the conditioned air.

As shown in FIG. 10B, the conditioned outflow air 52 exits the refrigerant vapor cycle system air conditioning pack air 76*b* once it is cooled and conditioned and flows to the aircraft cabin 24. Further, as shown in FIG. 10B, after having been conditioned and/or used for cooling, the reduced temperature cabin outflow air 48 may then flow overboard as exhaust outflow air 80.

Both air conditioning packs 76*a*, 76*b* may comprise further components such as valves, ducts, controllers, and other components known in the art. Embodiments of the air conditioning system 12 disclosed herein may also be used with other known aircraft air conditioning packs containing mechanical components known in the art. The air conditioning pack 76 may be located in the pack bay 30 (see FIG. 1) of the aircraft 10 beneath the wing 16. Additional air conditioning packs 76 may be located in other areas of the aircraft 10.

FIG. 3 is an illustration of a schematic diagram of another one of the embodiments of an aircraft air conditioning system 12, such as in the form of aircraft air conditioning system 12*b*. The aircraft air conditioning system 12, such as in the form of aircraft air conditioning system 12*b*, is similar to the aircraft air conditioning system 12*a* of FIG. 2, except that instead of the one or more air conditioning pack heat exchangers 78, such as preferably in the form of first heat exchanger 78*a* (see FIG. 11B) and second heat exchanger 78*b* (see FIG. 11B), connected to the air conditioning pack 76, there is an additional heat exchanger 79*a* (see FIG. 3), such as an air to liquid heat exchanger, positioned downstream of the turbine 63. The heat exchanger 79*a* is preferably an air to liquid heat exchanger, and is connected to the turbine 63 via duct 62*b* (see FIG. 3) that is upstream of the heat exchanger 79*a*. The heat exchanger 79*a* is preferably connected to the air conditioning pack 76 via duct 62*c* (see FIG. 3) that is downstream of the heat exchanger 79*a*.

As further shown in FIG. 3, the turbine outflow air 65 generated by the turbine 63 reduces the temperature of a liquid coolant stream 92 via the heat exchanger 79*a*. The liquid coolant stream 92 may enter the heat exchanger 79*a* from a heat source (not shown) on the aircraft 10, such as an aircraft liquid cooling system (not shown), an aircraft electronics system (not shown), galley carts or refrigeration (not shown), a supplemental cabin or cargo cooling system (not shown), or another aircraft system or component. After being cooled by the turbine outflow air 65, a reduced temperature liquid coolant stream 94 (see FIG. 3) flows back to the aircraft heat source. Thus, in this embodiment, the turbine outflow air 65 cools or reduces the temperature of the liquid coolant stream 92 via the heat exchanger 79*a* and generates the reduced temperature liquid coolant stream 94 that may be used for aircraft liquid thermal management. The heat exchanger 79*a* may thus be used as a heat sink for aircraft liquid thermal management. Alternatively, the heat exchanger 79*a* in this embodiment may be used to cool air or a refrigerant if that is desired. In this embodiment as shown in FIG. 3, the reduced temperature cabin outflow air 48, such as comprising turbine outflow air 65 from the turbine 63, may be connected to at least one heat exchanger 79*a*, such as an air to liquid heat exchanger, that is configured to aid in reducing heat of at least one liquid coolant stream 92 flowing through the at least one heat exchanger 79*a*, such as in the form of an air to liquid heat exchanger.

As further shown in FIG. 3, similar to the embodiment of FIG. 2 and as discussed above, the aircraft air conditioning system 12, such as in the form of aircraft air conditioning system 12*b*, comprises the duct system 61 having at least one duct 62*a* connected to the aircraft cabin 24 of the aircraft 10. As shown in FIG. 3, the duct system 61 further comprises ducts 62*b*, 62*c* and 62*d*. The at least one duct 62*a* flows the pressurized cabin outflow air 60 (see FIG. 3) from the aircraft cabin 24. The aircraft air conditioning system 12, such as in the form of aircraft air conditioning system 12*b*, further comprises the turbine 63 (see FIG. 3) connected to the at least one duct 62*a*. The turbine 63 is preferably a cabin energy recovery turbine 64 (see FIG. 3). The turbine 63 receives the pressurized cabin outflow air 60 and expands the pressurized cabin outflow air 60 through the turbine 63. The turbine 63 generates turbine outflow air 65 (see FIG. 3) and further extracts extracted energy 77 (see FIG. 11A) from the pressurized cabin outflow air 60 to generate power 67 (see FIG. 3).

As further shown in FIG. 3, the aircraft air conditioning system 12, such as in the form of aircraft air conditioning system 12*b*, further comprises at least one shaft 66 connected to the turbine 63. The shaft 66 is driven by the power 67 generated from the turbine 63. The shaft 66 is configured to generate energy to power one or more aircraft air conditioning system components 54 (see FIG. 3) and/or aircraft subsystems 36 (see FIG. 6). For example, the driving of the shaft 66 using the power 67 generated from the turbine 63 may be used to directly power or augment or assist the power supplied to the air conditioning system components 54 and/or the aircraft subsystems 36.

In the embodiment shown in FIG. 3, the one or more aircraft air conditioning system components 54 of the aircraft air conditioning system 12 may comprise a cabin compressor 70 that uses ram air 72*a* and an electric motor 68. The electric motor 68 provides energy to power the cabin compressor 70. Both the cabin compressor 70 and the electric motor 68 may be connected to the shaft 66. In a preferred embodiment, the electric motor 68 is attached on the shaft 66, and when the turbine 63 extracts the extracted energy 77 (see FIG. 11A) from the pressurized cabin outflow air 60, the turbine 63 generates power 67, such as in the form of shaft horsepower, to drive the shaft 66 and augment or assist the power from the electric motor 68 that powers the cabin compressor 70. Thus, the cabin compressor 70 may be powered in whole or in part by the turbine 63.

As shown in FIG. 3, a ram air duct 73 is connected to the cabin compressor 70. The ram air duct 73 may supply ram air 72*a* to the cabin compressor 70 from the external inlets 42, 44 (see FIGS. 1, 3) or another external inlet on the aircraft 10 (see FIGS. 1, 3). The external inlets 42, 44 shown in FIGS. 1 and 3 are examples and may comprise external ram air inlets positioned on underbelly portions of the fuselage 14 (see FIG. 1) of the aircraft 10 and configured for intake of ram air 72*a* into the aircraft 10 and through the ram air duct 73. Alternatively, the external inlets 42, 44 may be positioned on a lower portion of a wing box (not shown) underneath the wings 16 (see FIG. 1), on an upper front portion of the engines (not shown) of the aircraft 10, on another outer wall or skin surface of the aircraft 10, or on another suitable external surface of the aircraft 10. The cabin compressor 70 pressurizes the ram air 72a to the required pressure of the aircraft 10, thereby reducing the amount of power required by the aircraft engines to run the cabin compressor 70. Thus, the aircraft air conditioning system 12b augments the electrical power and may achieve the required performance of the aircraft 10 without having to increase the electrical power generation and distribution systems to the aircraft 10.

As shown in FIG. 3, the aircraft air conditioning system 12, such as in the form of aircraft air conditioning system 12b, further comprises an air conditioning pack 76 connected to the heat exchanger 79a via duct 62c and connected to the cabin compressor 70 via duct 62d. The aircraft air conditioning system 12, as shown in FIG. 3, uses ram air 72a and an electric motor 68, and is thus a ram air 72a electric based system.

As further shown in FIG. 3, the turbine outflow air 65 generated by the turbine 63 may be mixed with the ambient air source (e.g., outside air) 71, such as in the form of ram air 72b, as necessary to reduce mass flow of the ambient air source 71, such as in the form of ram air 72b, thus minimizing any associated ram system drag. The turbine outflow air 65 may be mixed with the ambient air source 71, such as in the form of ram air 72b, either upstream or downstream of the heat exchanger 79a and acts as a heat sink, such as a cold heat sink, for the aircraft air conditioning system 12, such as in the form of aircraft air conditioning system 12b, for subsonic aircraft such as commercial aircraft. The addition of the turbine outflow air 65 to the ambient air source 71, such as in the form of ram air 72b, may also provide the necessary heat sink capacity at high aircraft speeds (beyond Mach 1.0) for high speed or supersonic aircraft or lower secondary power available conditions, as high speed or supersonic aircraft typically have much hotter ram air than subsonic aircraft. The reduced temperature cabin outflow air 48 (see FIG. 3) may comprise the turbine outflow air 65 mixed with the ambient air source (e.g., outside air) 71, such as in the form of ram air 72b.

As further shown in FIG. 3, the ram air 72a is compressed in the cabin compressor 70 and generates a cabin compressor discharge air 74 that flows into the air conditioning pack 76 as a compressed inlet air stream 75 for cooling and conditioning. The compressed inlet air stream 75, such as in the form of cabin compressor discharge air 74, is received and cooled by the air conditioning pack 76, and the air conditioning pack 76 generates a conditioned outflow air 52 that then flows to the aircraft cabin 24. The conditioned outflow air 52 (see FIGS. 1, 3) flows into the aircraft cabin 24 and mixes with the cabin air 50 (see FIG. 1). Leakage and outflow air 40 (see FIGS. 1, 3) flows through the leakage and outflow air valves 38 (see FIG. 1) and out of the aircraft 10. As further shown in FIG. 3, the air conditioning pack 76 receives the reduced temperature cabin outflow air 48 (see FIG. 3) from the turbine 63. The reduced temperature cabin outflow air 48 may comprise turbine outflow air 65 that may be mixed with the ambient air source 71, such as in the form of ram air 72b. The reduced temperature cabin outflow air 48 that is received by the air conditioning pack 76, is preferably received by the one or more heat exchangers 78, and preferably two heat exchangers 78, is conditioned through the air conditioning pack 76, and then flows overboard as an exhaust outflow air 80.

Figure 4:
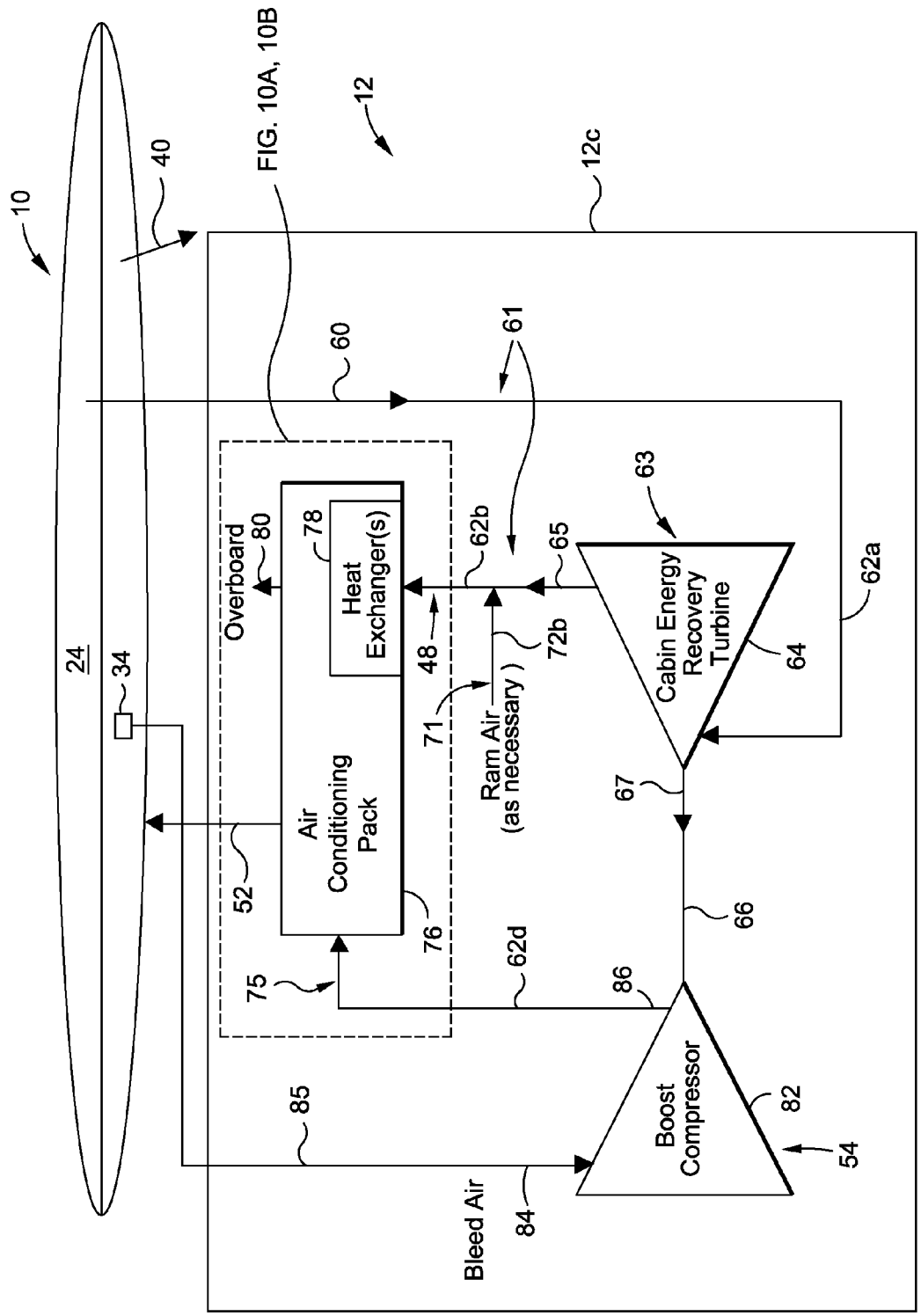
FIG. 4 is an illustration of a schematic diagram of one of the embodiments of an aircraft air conditioning system of the disclosure having a turbine that generates power to a boost compressor that pressurizes bleed air.

FIG. 4 is an illustration of a schematic diagram of another one of the embodiments of an aircraft air conditioning system 12, such as in the form of aircraft air conditioning system 12c. The aircraft air conditioning system 12, such as in the form of aircraft air conditioning system 12c, is similar to the aircraft air conditioning system 12a of FIG. 2, except that instead of having an electric motor 68 and a cabin compressor 70, this embodiment has a boost compressor 82 (see FIG. 4) that uses bleed air 84 (see FIG. 4) from an aircraft engine compressor 34 (see FIG. 4).). A bleed air duct 85 (see FIG. 4) may be connected to the aircraft engine compressor 34 (see FIG. 4) to supply bleed air 84 from the aircraft engine compressor 34 to the boost compressor 82. The bleed air 84 is compressed in the boost compressor 82 and generates a boost compressor discharge air 86 (see FIG. 4) that flows through duct 62d and is received by the air conditioning pack 76 as a compressed inlet air stream 75 (see FIG. 4) for cooling.

As shown in FIG. 4, the boost compressor 82 is connected to the shaft 66. This embodiment has similar ram air drag and high speed aircraft heat sink benefits as described in the embodiment of FIG. 2. However, this embodiment may be applicable to an air conditioning and pressurization system that uses bleed air 84 from the aircraft engine compressor 34 (see FIG. 4) rather than ram air 72a (see FIG. 3). For purposes of this application, "bleed air" means compressed air from an aircraft engine compressor that may be used as a source of power for the aircraft and that may be used to improve input performance to the air conditioning pack 76 (see FIG. 4). The aircraft air conditioning system 12c, as shown in FIG. 4, uses bleed air 84 and does not use an electric motor 68 (see FIG. 3), and is thus a bleed air 84 (compressed air) based system. In this embodiment, the compressor 69 (see FIG. 11A) is a boost compressor 82 (see FIG. 4) connected to a bleed air duct 85 (see FIG. 4) connected to an aircraft engine compressor 34 (see FIG. 4) on an aircraft 10 (see FIG. 4). The boost compressor 82 configured to receive the bleed air 84 (see FIG. 4) from the aircraft engine compressor 34 and is configured to compress and flow the bleed air 84 as the compressed inlet air stream 75 (see FIG. 4) to the air conditioning pack 76 (see FIG. 4).

As further shown in FIG. 4, the aircraft air conditioning system 12, such as in the form of aircraft air conditioning system 12c, comprises the duct system 61 having at least one duct 62a connected to the aircraft cabin 24 of the aircraft 10. As shown in FIG. 4, the duct system 61 further comprises ducts 62b and 62d. The at least one duct 62a flows the pressurized cabin outflow air 60 (see FIG. 4) from the aircraft cabin 24. The aircraft air conditioning system 12, such as in the form of aircraft air conditioning system 12c, further comprises the turbine 63 (see FIG. 4) connected to the at least one duct 62a. The turbine 63 is preferably a cabin energy recovery turbine 64 (see FIG. 4). The turbine 63 receives the pressurized cabin outflow air 60 and expands the pressurized cabin outflow air 60 through the turbine 63. The turbine 63 generates turbine outflow air 65 (see FIG. 4) and further extracts extracted energy 77 (see FIG. 11A) from the pressurized cabin outflow air 60 to generate power 67 (see FIG. 4).

As further shown in FIG. 4, the aircraft air conditioning system 12, such as in the form of aircraft air conditioning system 12b, further comprises at least one shaft 66 connected to the turbine 63. The shaft 66 is driven by the power 67 generated from the turbine 63. The shaft 66 is configured to generate energy to power one or more aircraft air conditioning system components 54 (see FIG. 4) and/or aircraft subsystems 36 (see FIG. 6). For example, the driving of the shaft 66 using the power 67 generated from the turbine 63 may be used to directly power or augment the power supplied to the air conditioning system components 54 and/or the aircraft subsystems 36.

In the embodiment shown in FIG. 4, the one or more aircraft air conditioning system components 54 of the aircraft air conditioning system 12 may comprise a boost compressor 82 that uses bleed air 84. The boost compressor 82 may be connected to the shaft 66. In a preferred embodiment, when the turbine 63 extracts the extracted energy 77 (see FIG. 11A) from the pressurized cabin outflow air 60, the turbine 63 generates power 67, such as in the form of shaft horsepower, to drive the shaft 66 and power in whole or in part the boost compressor 82. As shown in FIG. 4, a bleed air duct 85 is connected between the boost compressor 82 and the aircraft engine compressor 34 of the aircraft 10. The bleed air duct 85 supplies bleed air 84 from the aircraft engine compressor 34 to the boost compressor 82. The boost compressor 82 pressurizes the bleed air 84 to the required pressure of the aircraft 10, thereby reducing the amount of power required by the aircraft engines to run the boost compressor 82.

As further shown in FIG. 4, the aircraft air conditioning system 12, such as in the form of aircraft air conditioning system 12c, generates power 67 from the turbine 63 to augment or generate power to one or more aircraft air conditioning system components 54 (see FIG. 4), such as the boost compressor 82. Thus, the aircraft air conditioning system 12c augments the electrical power and may achieve the required performance of the aircraft 10 without having to increase the electrical power generation and distribution systems to the aircraft 10. In this embodiment, the power 67 generated by the turbine 63 may be used to drive the boost compressor 82 that uses bleed air 84. The boost compressor 82 then facilitates the use of a lower engine compression stage for bleed air extraction which can, in turn, save fuel. The power 67 generated from the turbine 63, such as a turbine in the form of the cabin energy recovery turbine 64, may thus be used to drive power or augment power to the boost compressor 82.

As further shown in FIG. 4, the turbine outflow air 65 generated by the turbine 63 may be mixed with the ambient air source (e.g., outside air) 71, such as in the form of ram air 72b, as necessary to take from ambient, to reduce mass flow of the ambient air source 71, such as in the form of ram air 72b, thus minimizing any associated ram system drag. The turbine outflow air 65 may be mixed with the outside air 71, such as in the form of ram air 72b, to act as a heat sink such as a cold heat sink for the aircraft air conditioning system 12, such as in the form of aircraft air conditioning system 12c, for subsonic aircraft such as commercial aircraft. The addition of the turbine outflow air 65 to the ambient air source 71, such as in the form of ram air 72b, may also provide the necessary heat sink capacity at high aircraft speeds (beyond Mach 1.0) for high speed or supersonic aircraft or lower secondary power available conditions, as high speed or supersonic aircraft typically have much hotter ram air than subsonic aircraft. The reduced temperature cabin outflow air 48 (see FIG. 4) may comprise the turbine outflow air 65 mixed with the ambient air source (e.g., outside air) 71, such as in the form of ram air 72b.

As further shown in FIG. 4, the bleed air 84 is compressed in the boost compressor 82 and generates a boost compressor discharge air 86 that flows through duct 62d and is received by the air conditioning pack 76 as a compressed inlet air stream 75 for conditioning and cooling. As further shown in FIG. 4, the aircraft air conditioning system 12, such as in the form of aircraft air conditioning system 12c, comprises an air conditioning pack 76 having one or more heat exchanger(s) 78 connected to the turbine 63 via at least duct 62b. The one or more heat exchanger(s) may comprise ram air heat exchangers such as in the form of a first heat exchanger 78a (see FIG. 10A) and a second heat exchanger 78b (see FIG. 10A). The heat exchangers 78 are preferably connected to the air conditioning pack 76 and may preferably be within the air conditioning pack 76, and are preferably positioned downstream of the turbine 63.

As further shown in FIG. 4, the turbine outflow air 65 that is mixed with the ambient air source 71, such as in the form of ram air 72b (see FIG. 4), comprises a reduced temperature cabin outflow air 48 that flows through the duct 62b, is received by the air conditioning pack 76, and preferably received by the one or more heat exchanger(s) 78, is conditioned through the air conditioning pack 76, and then flows overboard as an exhaust outflow air 80. The compressed inlet air stream 75, such as in the form of boost compressor discharge air 86, is received and cooled by the air conditioning pack 76, and the air conditioning pack 76 generates a conditioned outflow air 52 (see FIG. 4) that then flows to the aircraft cabin 24. The conditioned outflow air 52 (see FIGS. 1, 4) flows into the aircraft cabin 24 and mixes with the cabin air 50 (see FIG. 1). Leakage and outflow air 40 (see FIGS. 1, 4) flows through the leakage and outflow air valves 38 (see FIG. 1) and out of the aircraft 10.

Figure 5:
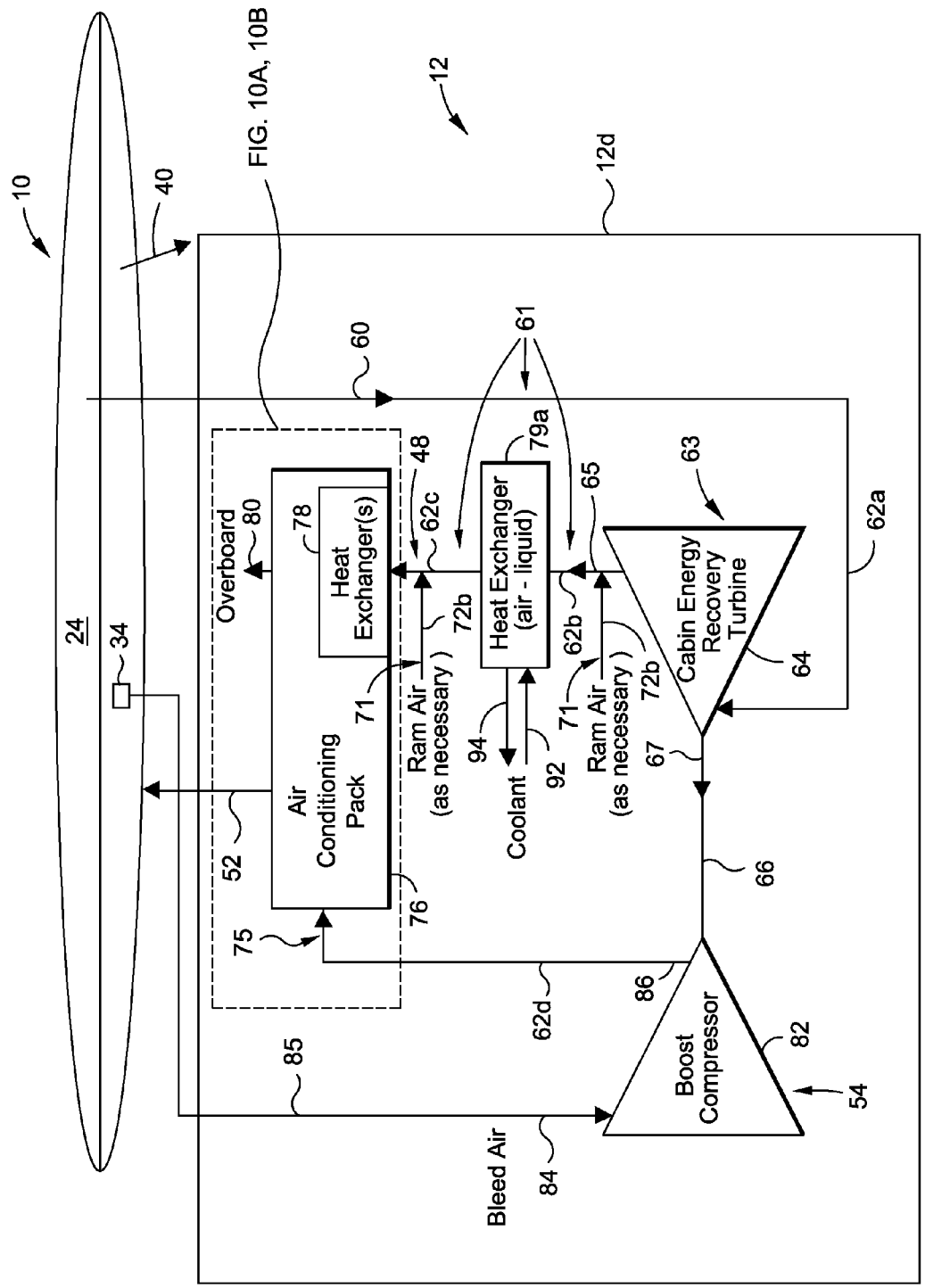
FIG. 5 is an illustration of a schematic diagram of another one of the embodiments of an aircraft air conditioning system of the disclosure having a turbine that generates power to a boost compressor that pressurizes bleed air.

FIG. 5 is an illustration of a schematic diagram of another one of the embodiments of an aircraft air conditioning system 12, such as in the form of aircraft air conditioning system 12d. The aircraft air conditioning system 12, such as in the form of aircraft air conditioning system 12d, is similar to the aircraft air conditioning system 12c of FIG. 4, except that instead of the one or more air conditioning pack heat exchangers 78, such as in the form of first heat exchanger 78a (see FIG. 11B) and second heat exchanger 78b (see FIG. 11B), connected to the air conditioning pack 76, there is an additional heat exchanger 79a positioned downstream of the turbine 63. The heat exchanger 79a is preferably an air to liquid heat exchanger, and is connected to the turbine 63 via duct 62b that is upstream of the heat exchanger 79a. The heat exchanger 79a is preferably connected to the air conditioning pack 76 via duct 62c (see FIG. 5) that is downstream of the heat exchanger 79a.

As shown in FIG. 5, the turbine outflow air 65 generated by the turbine 63 reduces the temperature of the liquid coolant stream 92 via the heat exchanger 79a. The liquid coolant stream 92 may enter the heat exchanger 79a from a heat source on the aircraft 10, such as an aircraft liquid cooling system (not shown), an aircraft electronics system (not shown), galley carts or refrigeration (not shown), a supplemental cabin or cargo cooling system (not shown), or another aircraft system or component. The heat exchanger 79a reduces the temperature of the liquid coolant stream 92 and the reduced temperature liquid coolant stream 94 flows back to the aircraft heat source. Thus, in this embodiment, the turbine outflow air 65 cools or reduces the temperature of the liquid coolant stream 92 via the heat exchanger 79a and generates the reduced temperature liquid coolant stream 94 that may be used for aircraft liquid thermal management. The heat exchanger 79a may thus be used as a heat sink for aircraft liquid thermal management. Alternatively, the heat exchanger 79a in this embodiment may be used to cool air or a refrigerant if that is desired.

As further shown in FIG. 5, similar to the embodiment of FIG. 4, and as discussed above, the aircraft air conditioning system 12, such as in the form of aircraft air conditioning system 12d, comprises the duct system 61 having at least one duct 62a connected to the aircraft cabin 24 of the aircraft

10. As shown in FIG. 5, the duct system 61 further comprises ducts 62*b*, 62*c* and 62*d*. The at least one duct 62*a* flows the pressurized cabin outflow air 60 (see FIG. 5) from the aircraft cabin 24. The aircraft air conditioning system 12, such as in the form of aircraft air conditioning system 12*d*, further comprises the turbine 63 (see FIG. 5) connected to the at least one duct 62*a*. The turbine 63 is preferably a cabin energy recovery turbine 64 (see FIG. 5). The turbine 63 receives the pressurized cabin outflow air 60 and expands the pressurized cabin outflow air 60 through the turbine 63. The turbine 63 generates turbine outflow air 65 (see FIG. 5) and further extracts extracted energy 77 (see FIG. 11A) from the pressurized cabin outflow air 60 to generate power 67 (see FIG. 5). As further shown in FIG. 5, the aircraft air conditioning system 12, such as in the form of aircraft air conditioning system 12*d*, further comprises the boost compressor 82 that uses bleed air 84. A bleed air duct 85 (see FIG. 5) may be connected to the aircraft engine compressor 34 (see FIGS. 1, 5) to supply bleed air 84 from the aircraft engine compressor 34 to the boost compressor 82. The bleed air 84 is compressed in the boost compressor 82 and generates a boost compressor discharge air 86 (see FIG. 5) that flows through duct 62*d* and is received by the air conditioning pack 76 (see FIG. 5) as a compressed inlet air stream 75 for cooling and conditioning. The aircraft air conditioning system 12*d*, as shown in FIG. 5, uses bleed air 84 and does not use an electric motor 68, and is thus a bleed air 84 (compressed air) based system.

As further shown in FIG. 5, the at least one shaft 66 connected to the turbine 63 is driven or powered by the pressurized cabin outflow air 60 and the extracted energy 77 generated from the turbine 63. The shaft 66 is driven by the power 67 generated from the turbine 63. The shaft 66 is configured to generate energy to power one or more aircraft air conditioning system components 54 (see FIG. 4) and/or aircraft subsystems 36 (see FIG. 6). For example, the driving of the shaft 66 using the power 67 generated from the turbine 63 may be used to directly power or augment the power supplied to the air conditioning system components 54 and/or the aircraft subsystems 36. Thus, the boost compressor 82 may be powered by the power 67 from the turbine 63, and the aircraft air conditioning system 12, such as in the form of aircraft air conditioning system 12*d*, may achieve the required performance of the aircraft 10 without having to increase the electrical power generation and distribution systems to the aircraft 10.

As further shown in FIG. 5, the turbine outflow air 65 generated by the turbine 63 may be mixed with the ambient air source (e.g., outside air) 71, such as in the form of ram air 72*b*, as necessary to take from ambient, to reduce mass flow of the ambient air source 71, such as in the form of ram air 72*b*, thus minimizing any associated ram system drag. The turbine outflow air 65 may be mixed with the ambient air source 71, such as in the form of ram air 72*b*, either upstream or downstream of the heat exchanger 79*a* and acts as a heat sink such as a cold heat sink for the aircraft air conditioning system 12, such as in the form of aircraft air conditioning system 12*d*, for subsonic aircraft such as commercial aircraft. The addition of the turbine outflow air 65 to the ambient air source 71, such as in the form of ram air 72*b*, may also provide the necessary heat sink capacity at high aircraft speeds (beyond Mach 1.0) for high speed or supersonic aircraft or lower secondary power available conditions, as high speed or supersonic aircraft typically have much hotter ram air than subsonic aircraft. The reduced temperature cabin outflow air 48 (see FIG. 5) may comprise the turbine outflow air 65 mixed with the ambient air source (e.g., outside air) 71, such as in the form of ram air 72*b*.

As further shown in FIG. 5, the bleed air 84 is compressed in the boost compressor 82 and generates a boost compressor discharge air 86 that flows through duct 62*d* into the air conditioning pack 76 as a compressed inlet air stream 75 for cooling and conditioning. The compressed inlet air stream 75, such as in the form of boost compressor exhaust air 82, is cooled and conditioned by the air conditioning pack 76, and the air conditioning pack 76 generates a conditioned outflow air 52 (see FIG. 5) that then flows to the aircraft cabin 24. The conditioned outflow air 52 (see FIGS. 1, 5) flows into the aircraft cabin 24 and mixes with the cabin air 50 (see FIG. 1). Leakage and outflow air 40 (see FIGS. 1, 5) flows through the leakage and outflow air valves 38 (see FIG. 1) and out of the aircraft 10. As further shown in FIG. 5, the air conditioning pack 76 receives the reduced temperature cabin outflow air 48 from the turbine 63. The reduced temperature cabin outflow air 48 may comprise turbine outflow air 65 that may be mixed with the ambient air source 71, such as in the form of ram air 72*b*. The reduced temperature cabin outflow air 48 that is received by the air conditioning pack 76, is preferably received by the one or more heat exchangers 78, is conditioned through the air conditioning pack 76, and then flows overboard as an exhaust outflow air 80.

Figure 6:
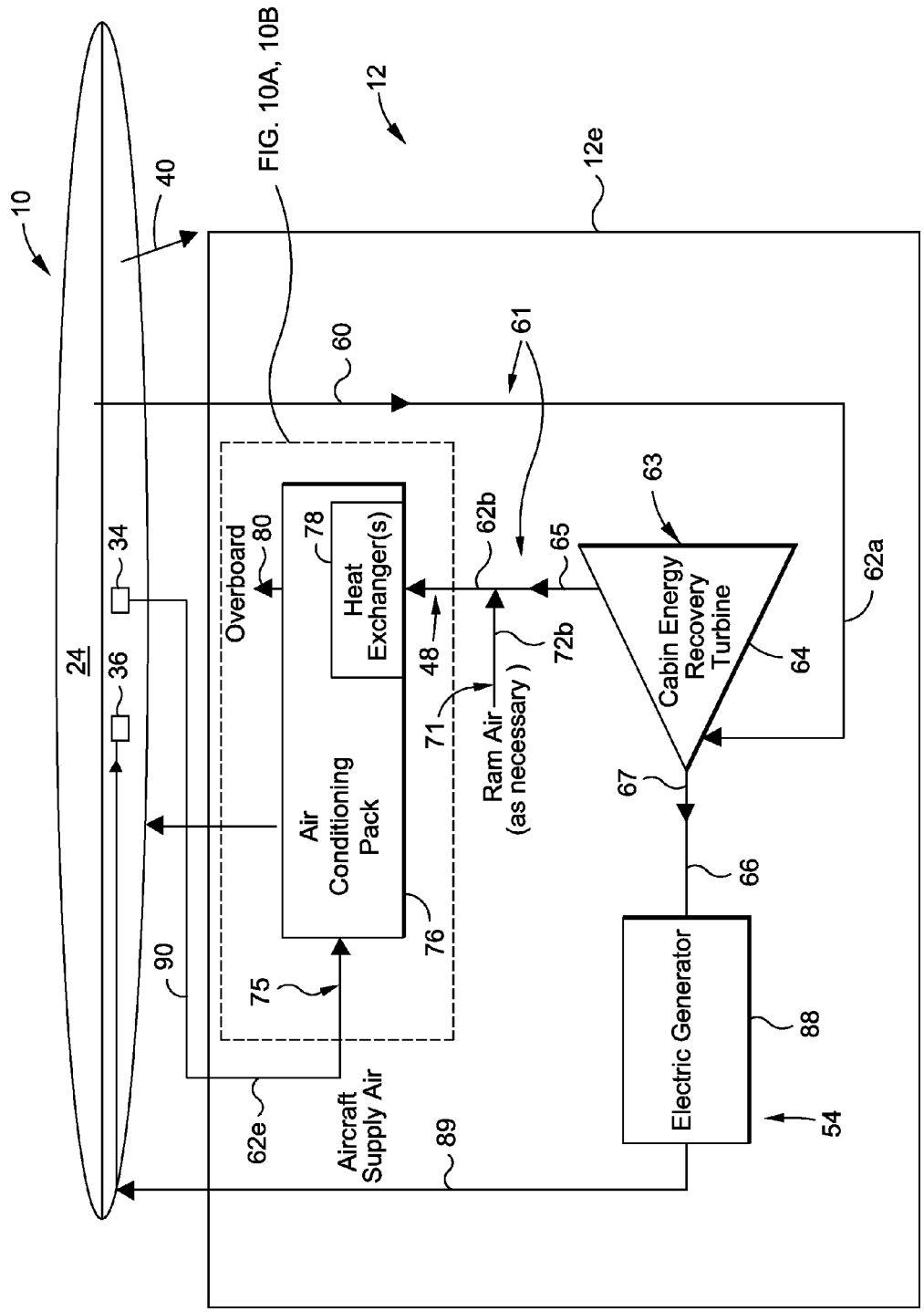
FIG. 6 is an illustration of a schematic diagram of one of the embodiments of an aircraft air conditioning system of the disclosure having a turbine that generates power to an electric generator.

FIG. 6 is an illustration of a schematic diagram of another one of the embodiments of an aircraft air conditioning system 12, such as in the form of aircraft air conditioning system 12*e*. The aircraft air conditioning system 12, such as in the form of aircraft air conditioning system 12*e*, is similar to the aircraft air conditioning system 12*a* of FIG. 2, except that instead of having an electric motor 68 and cabin compressor 70 that uses ram air 72*a*, the embodiment has an electric generator 88 (see FIG. 6) and no electric motor 68. In this embodiment, as shown in FIG. 6, the shaft 66 connects the turbine 63 to the electric generator 88 instead of the compressor 69 (see FIG. 11B). The electric generator 88 is configured to generate an electrical current, and the electric generator 88 is in electrical connection with an aircraft subsystem 36 (see FIG. 6) and is configured to power the aircraft subsystem 36. The electric generator 88 is connected to the shaft 66 (see FIG. 6). This embodiment functions in the same way as that of the embodiment shown in FIG. 2 and also has the same ram drag and high aircraft speed heat sink benefits. However, this embodiment may be used independent of the type of air conditioning and pressurization air source (e.g., bleed air or other compressed air source). The power 67 (see FIG. 6) generated by the turbine 63 (see FIG. 6) is used to drive the electric generator 88. The power 67 generated from the turbine 63, such as a turbine in the form of the cabin energy recovery turbine 64, may thus be used to directly power or augment power to the electric generator 88. The electric generator 88 augments power to one or more aircraft subsystems 36 (see FIGS. 1 and 6) on the aircraft 10 (see FIGS. 1 and 6) via path 89 (see FIG. 6).

As further shown in FIG. 6, the aircraft air conditioning system 12, such as in the form of aircraft air conditioning system 12*e*, comprises the duct system 61 having at least one duct 62*a* connected to the aircraft cabin 24 of the aircraft 10. As shown in FIG. 6, the duct system 61 further comprises ducts 62*b* and 62*e*. The at least one duct 62*a* flows the pressurized cabin outflow air 60 (see FIG. 6) from the aircraft cabin 24. The aircraft air conditioning system 12, such as in the form of aircraft air conditioning system 12*e*, further comprises the turbine 63 (see FIG. 6) connected to the at least one duct 62*a*. The turbine 63 is preferably a cabin energy recovery turbine 64 (see FIG. 6). The turbine 63 receives the pressurized cabin outflow air 60 and expands the pressurized cabin outflow air 60 through the turbine 63. The turbine 63 generates turbine outflow air 65 (see FIG. 6) and further extracts extracted energy 77 (see FIG. 11A) from the pressurized cabin outflow air 60 to generate power 67 (see FIG. 6).

As further shown in FIG. 6, the aircraft air conditioning system 12, such as in the form of aircraft air conditioning system 12e, further comprises at least one shaft 66 connected to the turbine 63. The shaft 66 is driven by the power 67 generated from the turbine 63. The shaft 66 is configured to generate power 67 from the turbine 63 to augment or generate power to one or more aircraft air conditioning system components 54 (see FIG. 6), such as the electric generator 88. Thus, the electric generator 88 may be powered by the power 67 from the turbine 63, and the aircraft air conditioning system 12, such as in the form of aircraft air conditioning system 12e may achieve the required performance of the aircraft 10 without having to increase the electrical power generation and distribution systems to the aircraft 10.

As further shown in FIG. 6, the turbine outflow air 65 generated by the turbine 63 may be mixed with the ambient air source (e.g., outside air) 71, such as in the form of ram air 72b, as necessary to take from ambient, to reduce mass flow of the ambient air source 71, such as in the form of ram air 72b, thus minimizing any associated ram system drag. The turbine outflow air 65 may be mixed with the ambient air source 71, such as in the form of ram air 72b, to act as a heat sink such as a cold heat sink for the aircraft air conditioning system 12, such as in the form of aircraft air conditioning system 12e, for subsonic aircraft such as commercial aircraft. The addition of the turbine outflow air 65 to the ambient air source 71, such as in the form of ram air 72b, may also provide the necessary heat sink capacity at high aircraft speeds (beyond Mach 1.0) for high speed or supersonic aircraft or lower secondary power available conditions, as high speed or supersonic aircraft typically have much hotter ram air than subsonic aircraft. The reduced temperature cabin outflow air 48 (see FIG. 6) may comprise the turbine outflow air 65 mixed with the ambient air source (e.g., outside air) 71, such as in the form of ram air 72b.

As further shown in FIG. 6, aircraft supply air 90 may be compressed by an aircraft engine compressor 34 or an ancillary compressor device 35 (see FIGS. 11A-11B) and the aircraft supply air 90 flows from the aircraft 10 and through duct 62e and is received by the air conditioning pack 76 as a compressed inlet air stream 75 for cooling and conditioning. The compressed inlet air stream 75, such as in the form of aircraft supply air 90, is received and cooled by the air conditioning pack 76, and the air conditioning pack 76 generates a conditioned outflow air 52 (see FIG. 6) that then flows to the aircraft cabin 24. The conditioned outflow air 52 (see FIGS. 1, 6) flows into the aircraft cabin 24 and mixes with the cabin air 50 (see FIG. 1). Leakage and outflow air 40 (see FIGS. 1, 6) flows through the leakage and outflow air valves 38 (see FIG. 1) and out of the aircraft 10. As further shown in FIG. 6, the turbine outflow air 65 that is mixed with the ambient air source 71, such as in the form of ram air 72b, comprises a reduced temperature cabin outflow air 48 that flows through duct 62b, is received by the air conditioning pack 76, is preferably received by the one or more heat exchangers 78, and more preferably by the first heat exchanger 78a and the second heat exchanger 78b, is conditioned through the air conditioning pack 76, and then flows overboard as an exhaust outflow air 80. In this embodiment, the compressor 69 (see FIG. 11A) is an aircraft engine compressor 34 (see FIG. 6) on an aircraft 10 or an ancillary compressor device 35 (see FIGS. 11A-11B) connected to a duct system 61 (see FIG. 6), such as duct 62e (see FIG. 6) connected to the air conditioning pack 76. The aircraft engine compressor 34 (see FIG. 6) or the ancillary compressor device 35 is configured to compress and flow an aircraft supply air 90 as the compressed inlet air stream 75 to the air conditioning pack 76.

Figure 7:
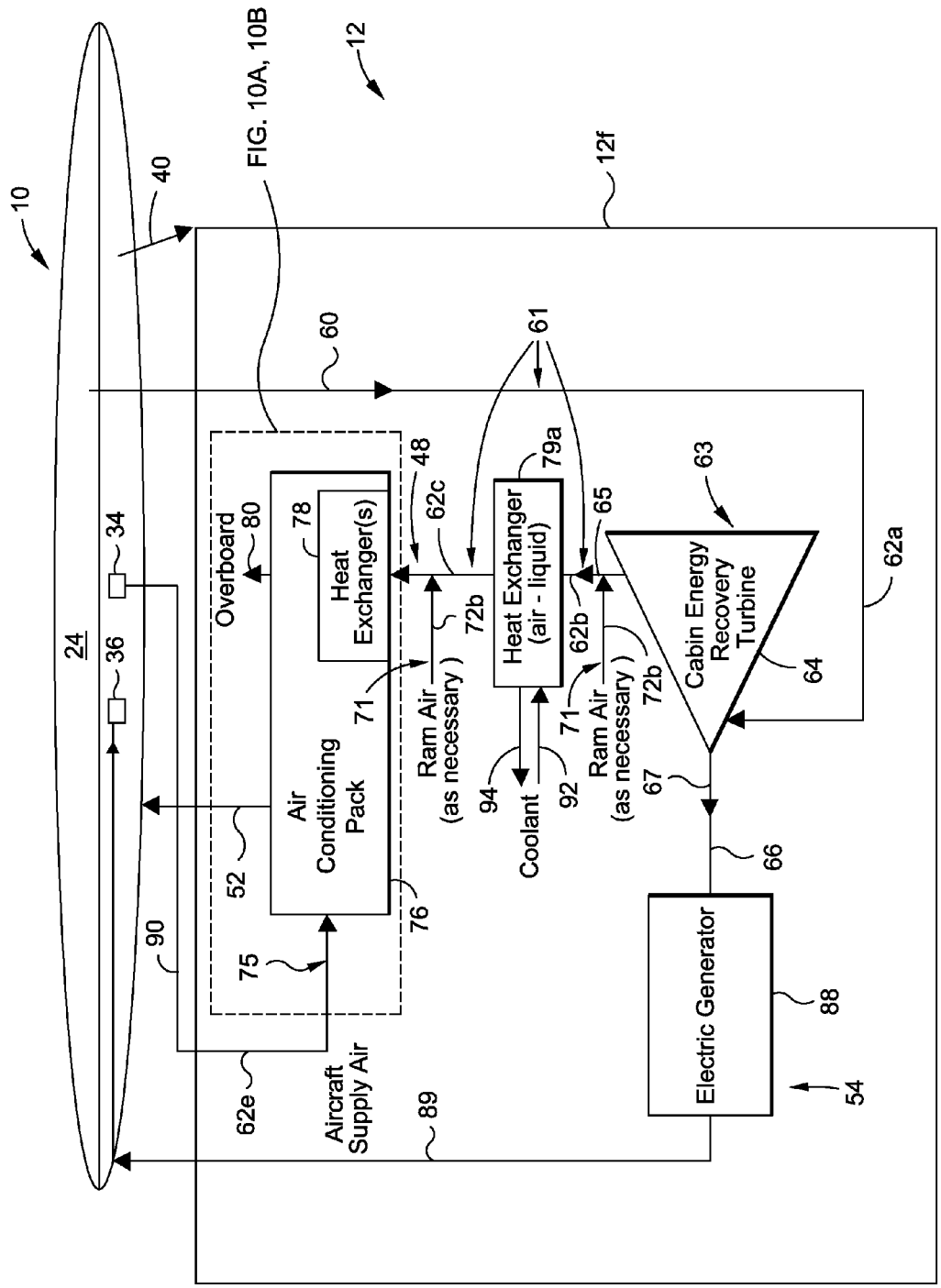
FIG. 7 is an illustration of a schematic diagram of another one of the embodiments of an aircraft air conditioning system of the disclosure having a turbine that generates power to an electric generator.
Figure 8:
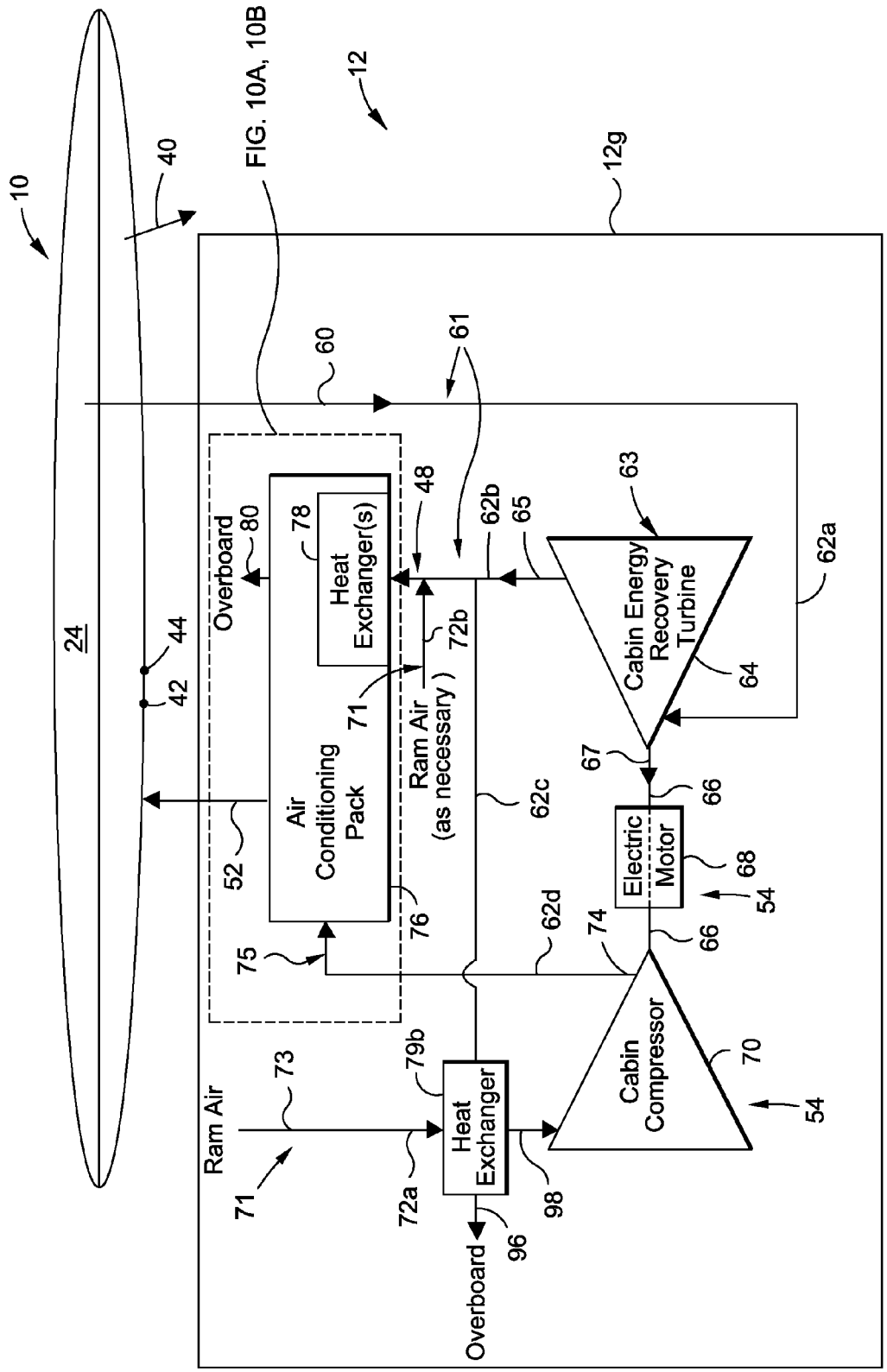
FIG. 8 is an illustration of a schematic diagram of one of the embodiments of an aircraft air conditioning system of the disclosure having a turbine that generates power to an electric motor and a cabin compressor that pressurizes ram air flowing through a heat exchanger upstream of the cabin compressor.

FIG. 7 is an illustration of a schematic diagram of another one of the embodiments of an aircraft air conditioning system 12, such as in the form of aircraft air conditioning system 12f. The aircraft air conditioning system 12, such as in the form of aircraft air conditioning system 12f, is similar to the aircraft air conditioning system 12e of FIG. 6, except that instead of the one or more air conditioning pack heat exchanger(s) 78, such as in the form of first heat exchanger 78a (see FIG. 11B) and second heat exchanger 78b (see FIG. 11B), connected to the air conditioning pack 76, there is an additional heat exchanger 79a (see FIG. 7) positioned downstream of the turbine 63. The heat exchanger 79a is preferably an air to liquid heat exchanger, and is connected to the turbine 63 via duct 62b (see FIG. 7) that is upstream of the heat exchanger 79a. The heat exchanger 79a is preferably connected to the air conditioning pack 76 via duct 62c (see FIG. 7) that is downstream of the heat exchanger 79a.

As shown in FIG. 7, the turbine outflow air 65 generated by the turbine 63 reduces the temperature of the liquid coolant stream 92 via the heat exchanger 79a. The liquid coolant stream 92 may enter the heat exchanger 79a from a heat source (not shown) on the aircraft, such as an aircraft liquid cooling system (not shown), an aircraft electronics system (not shown), galley carts or refrigeration (not shown), a supplemental cabin or cargo cooling system, or another aircraft system or component. The heat exchanger 79a reduces the temperature of the liquid coolant stream 92 and the reduced temperature liquid coolant stream 94 flows back to the aircraft heat source. Thus, in this embodiment, the turbine outflow air 65 cools or reduces the temperature of the liquid coolant stream 92 via the heat exchanger 79a and generates the reduced temperature liquid coolant stream 94 that may be used for aircraft liquid thermal management. The heat exchanger 79a may thus be used as a heat sink for aircraft liquid thermal management. Alternatively, the heat exchanger 79a in this embodiment may be used to cool air or a refrigerant if that is desired.

As further shown in FIG. 7, similar to the embodiment of FIG. 6 and as discussed above, the aircraft air conditioning system 12, such as in the form of aircraft air conditioning system 12f, comprises the duct system 61 having at least one duct 62a connected to the aircraft cabin 24 of the aircraft 10. As shown in FIG. 7, the duct system 61 further comprises ducts 62b, 62c and 62e. The at least one duct 62a flows the pressurized cabin outflow air 60 (see FIG. 7) from the aircraft cabin 24. The aircraft air conditioning system 12, such as in the form of aircraft air conditioning system 12f, further comprises the turbine 63 (see FIG. 7) connected to the at least one duct 62a. The turbine 63 is preferably a cabin energy recovery turbine 64 (see FIG. 7). The turbine 63 receives the pressurized cabin outflow air 60 and expands the pressurized cabin outflow air 60 through the turbine 63. The turbine 63 generates turbine outflow air 65 (see FIG. 7) and further extracts extracted energy 77 (see FIG. 11A) from the pressurized cabin outflow air 60 to generate power 67 (see FIG. 7). As further shown in FIG. 7, the aircraft air conditioning system 12, such as in the form of aircraft air conditioning system 12f, further comprises the electric generator 88. The first heat exchanger 78a and the second heat exchanger 78b are positioned downstream of the turbine 63.

As further shown in FIG. 7, the aircraft air conditioning system 12, such as in the form of aircraft air conditioning system 12f, further comprises at least one shaft 66 connected to the turbine 63. The shaft 66 is driven by the power 67 generated from the turbine 63. The shaft 66 is configured to generate power 67 from the turbine 63 to augment or generate power to one or more aircraft air conditioning system components 54 (see FIG. 7), such as the electric generator 88. The power 67 (see FIG. 6) generated by the turbine 63 (see FIG. 6) is used to drive the electric generator 88. The power 67 generated from the turbine 63, such as a turbine in the form of the cabin energy recovery turbine 64, may thus be used to directly power or augment power to the electric generator 88. The electric generator 88 may augment power to one or more aircraft subsystems 36 (see FIGS. 1 and 7) on the aircraft 10 (see FIGS. 1 and 7) via path 89 (see FIG. 7). Thus, the electric generator 88 may be powered by the power 67 from the turbine 63, and the aircraft air conditioning system 12, such as in the form of aircraft air conditioning system 12f, may achieve the required performance of the aircraft 10 without having to increase the electrical power generation and distribution systems to the aircraft 10.

As further shown in FIG. 7, the turbine outflow air 65 generated by the turbine 63 may be mixed with the ambient air source (e.g., outside air) 71, such as in the form of ram air 72b, as necessary to take from ambient, to reduce mass flow of the ambient air source 71, such as in the form of ram air 72b, thus minimizing any associated ram system drag. The turbine outflow air 65 may be mixed with the ambient air source 71, such as in the form of ram air 72b, either upstream or downstream of the heat exchanger 79a and acts as a cold heat sink for the aircraft air conditioning system 12, such as in the form of aircraft air conditioning system 12f, for subsonic aircraft such as commercial aircraft. The addition of the turbine outflow air 65 to the ambient air source 71, such as in the form of ram air 72b, may also provide the necessary heat sink capacity at high aircraft speeds (beyond Mach 1.0) for high speed or supersonic aircraft or lower secondary power available conditions, as high speed or supersonic aircraft typically have much hotter ram air than subsonic aircraft. The reduced temperature cabin outflow air 48 (see FIG. 7) may comprise the turbine outflow air 65 mixed with the ambient air source (e.g., outside air) 71, such as in the form of ram air 72b.

As further shown in FIG. 7, the aircraft supply air 90 from the aircraft 10 may be compressed by an aircraft engine compressor 34 or an ancillary compressor device 35 (see FIGS. 11A-11B) and the aircraft supply air 90 flows from the aircraft 10 and into the air conditioning pack 76 as a compressed inlet air stream 75 for cooling and conditioning. The compressed inlet air stream 75, such as in the form of aircraft supply air 90, is received and cooled by the air conditioning pack 76, and the air conditioning pack 76 generates a conditioned outflow air 52 (see FIG. 7) that then flows to the aircraft cabin 24. The conditioned outflow air 52 (see FIGS. 1, 7) flows into the aircraft cabin 24 and mixes with the cabin air 50 (see FIG. 1). Leakage and outflow air 40 (see FIGS. 1, 7) flows through the leakage and outflow air valves 38 (see FIG. 1) and out of the aircraft 10. As further shown in FIG. 7, the reduced temperature cabin outflow air 48 comprising the turbine outflow air 65 mixed with the ambient air source 71, such as in the form of ram air 72b, is received by the air conditioning pack 76, is preferably received by the one or more heat exchangers 78, such as first heat exchanger 78a (see FIG. 10A) and second heat exchanger 78b (see FIG. 10A), is conditioned through the air conditioning pack 76, and then flows overboard as an exhaust outflow air 80.

FIG. 8 is an illustration of a schematic diagram of another one of the embodiments of an aircraft air conditioning system 12, such as in the form of aircraft air conditioning system 12g. The aircraft air conditioning system 12, such as in the form of aircraft air conditioning system 12g, is similar to the aircraft air conditioning system 12b of FIG. 3, except that instead of the one or more air conditioning pack heat exchangers 78, such as in the form of first heat exchanger 78a (see FIG. 11B) and second heat exchanger 78b (see FIG. 11B), connected to the air conditioning pack 76, there is an additional heat exchanger 79b positioned upstream of the cabin compressor 70. The heat exchanger 79b is preferably an air to air heat exchanger and is preferably connected to duct 62b via duct 62c (see FIG. 8). In this embodiment, some of the turbine outflow air 65 may be used to pre-cool the ram air 72a via the heat exchanger 79b before it is compressed by the cabin compressor 70 for use in cabin air conditioning, ventilation, and pressurization. This embodiment may also be beneficial in high aircraft speed applications such as supersonic aircraft where ram air 72a may be hotter than in subsonic or commerical aircraft. In this embodiment as shown in FIG. 8, the turbine outflow air 65, such as in the form of reduced temperature cabin outflow air 48, of the turbine 63 may be connected to at least one heat exchanger 79b, such as an air to air heat exchanger, positioned upstream of the compressor 69 (see FIG. 11A), such as cabin compressor 70. The at least one heat exchanger 79b, such as in the form of an air to air heat exchanger, is preferably configured to aid in reducing heat of ram air 72a from an ambient air source 71 entering the compressor 69 (see FIG. 11A), such as cabin compressor 70.

As further shown in FIG. 8, similar to the embodiment of FIG. 3 and as discussed above, the aircraft air conditioning system 12, such as in the form of aircraft air conditioning system 12g, comprises the duct system 61 having at least one duct 62a connected to the aircraft cabin 24. As shown in FIG. 8, the duct system 61 further comprises ducts 62b, 62c and 62d. The at least one duct 62a flows the pressurized cabin outflow air 60 (see FIG. 8) from the aircraft cabin 24. The aircraft air conditioning system 12, such as in the form of aircraft air conditioning system 12g, further comprises the turbine 63 (see FIG. 8) connected to the at least one duct 62a. The turbine 63 is preferably a cabin energy recovery turbine 64 (see FIG. 8). The turbine 63 receives the pressurized cabin outflow air 60 and expands the pressurized cabin outflow air 60 through the turbine 63. The turbine 63 generates turbine outflow air 65 (see FIG. 8) and further extracts extracted energy 77 (see FIG. 11A) from the pressurized cabin outflow air 60 to generate power 67 (see FIG. 8). As shown in FIG. 8, the aircraft air conditioning system 12, such as in the form of aircraft air conditioning system 12g, further comprises the electric motor 68, the cabin compressor 70 that uses ram air 72a pre-cooled with the turbine outflow air 65 via the heat exchanger 79b, and the air conditioning pack 76 connected to the first heat exchanger 78a. The aircraft air conditioning system 12g, as shown in FIG. 8, uses ram air 72a, pre-cooled ram air 98, and an electric motor 68, and is thus a ram air 72a electric based system.

As further shown in FIG. 8, the aircraft air conditioning system 12, such as in the form of aircraft air conditioning system 12g, further comprises at least one shaft 66 connected to the turbine 63. The shaft 66 is driven by the pressurized cabin outflow air 60 and the power 67 generated from the turbine 63. The shaft 66 is configured to generate energy to power one or more aircraft air conditioning system components 54 (see FIG. 8) and/or aircraft subsystems 36 (see FIG. 6). For example, the driving of the shaft 66 using the power 67 generated from the turbine 63 may be used to directly power or augment or assist the power supplied to one or more aircraft air conditioning system components 54 (see FIG. 8), such as the electric motor 68 and the cabin compressor 70. Thus, the aircraft air conditioning system 12, such as in the form of aircraft air conditioning system 12g, augments the electrical power and may achieve the required performance of the aircraft 10 without having to increase the electrical power generation and distribution systems to the aircraft 10.

As further shown in FIG. 8, the turbine outflow air 65 generated by the turbine 63 may be mixed with the ambient air source (e.g., outside air) 71, such as in the form of ram air 72b, as necessary to take from ambient, to reduce mass flow of the ambient air source 71, such as in the form of ram air 72b, thus minimizing any associated ram system drag. The turbine outflow air 65 may be mixed with the ambient air source 71, such as in the form of ram air 72b, to act as a cold heat sink for the aircraft air conditioning system 12, such as in the form of aircraft air conditioning system 12g, for subsonic aircraft such as commercial aircraft. The addition of the turbine outflow air 65 to the ambient air source 71, such as in the form of ram air 72b, may also provide the necessary heat sink capacity at high aircraft speeds (beyond Mach 1.0) for high speed or supersonic aircraft or lower secondary power available conditions, as high speed or supersonic aircraft typically have much hotter ram air than subsonic aircraft. The reduced temperature cabin outflow air 48 (see FIG. 8) may comprise the turbine outflow air 65 mixed with the ambient air source (e.g., outside air) 71, such as in the form of ram air 72b.

As further shown in FIG. 8, the ram air 72a is pre-cooled by the heat exchanger 79b and a ram air duct 73 may be connected to the heat exchanger 79b, and in turn, the cabin compressor 70. The ram air duct may 73 may supply ram air 72a from the external inlet 42 or the external inlet 44, or another inlet on the aircraft 10, to the cabin compressor 70 via the heat exchanger 79b. The external inlets 42, 44 shown in FIGS. 1 and 8 are examples and may comprise external ram air inlets positioned on underbelly portions of the fuselage 14 (see FIG. 1) of the aircraft 10 and configured for intake of ram air 72a into the aircraft 10 and through the ram air duct 73. Alternatively, the external inlets 42, 44 may be positioned on a lower portion of a wing box (not shown) underneath the wings 16 (see FIG. 1), on an upper front portion of the engines (not shown) of the aircraft 10, on another outer wall or skin surface of the aircraft 10, or on another suitable external surface of the aircraft 10. The turbine outflow air 65 flows through duct 62c (see FIG. 8) and through the heat exchanger 79b, which is a cross flow heat exchanger. The turbine outflow air 65 pre-cools air, such as the ram air 72a, via the heat exchanger 79b, prior to the air, such as the ram air 72a, being compressed by the cabin compressor 70. A pre-cooled ram air 98 (see FIG. 8) flows out of the heat exchanger 79b and into the cabin compressor 70 to be compressed. A cold side air flow 96 (see FIG. 8) flows out of the heat exchanger 79b and is exhausted overboard and out of the aircraft 10.

The cabin compressor 70 generates a cabin compressor discharge air 74 that flows into and is received by the air conditioning pack 76 as a compressed inlet air stream 75 for cooling and conditioning. The compressed inlet air stream 75, such as in the form of cabin compressor discharge air 74, is received and cooled by the air conditioning pack 76, and the air conditioning pack 76 generates a conditioned outflow air 52 (see FIG. 8) that then flows to the aircraft cabin 24. The conditioned outflow air 52 (see FIGS. 1, 8) flows into the aircraft cabin 24 and mixes with the cabin air 50 (see FIG. 1). Leakage and outflow air 40 (see FIGS. 1, 8) flows through the leakage and outflow air valves 38 (see FIG. 1) and out of the aircraft 10. As further shown in FIG. 8, the turbine outflow air 65 that is mixed with the ambient air source 71, such as in the form of ram air 72b, comprises a reduced temperature cabin outflow air 48 that flows through duct 62b, is received by the air conditioning pack 76, is preferably received by the one or more heat exchangers 78, such as first heat exchanger 78a and second heat exchanger 78b, is conditioned through the air conditioning pack 76, and then flows overboard as an exhaust outflow air 80.

Figure 9:
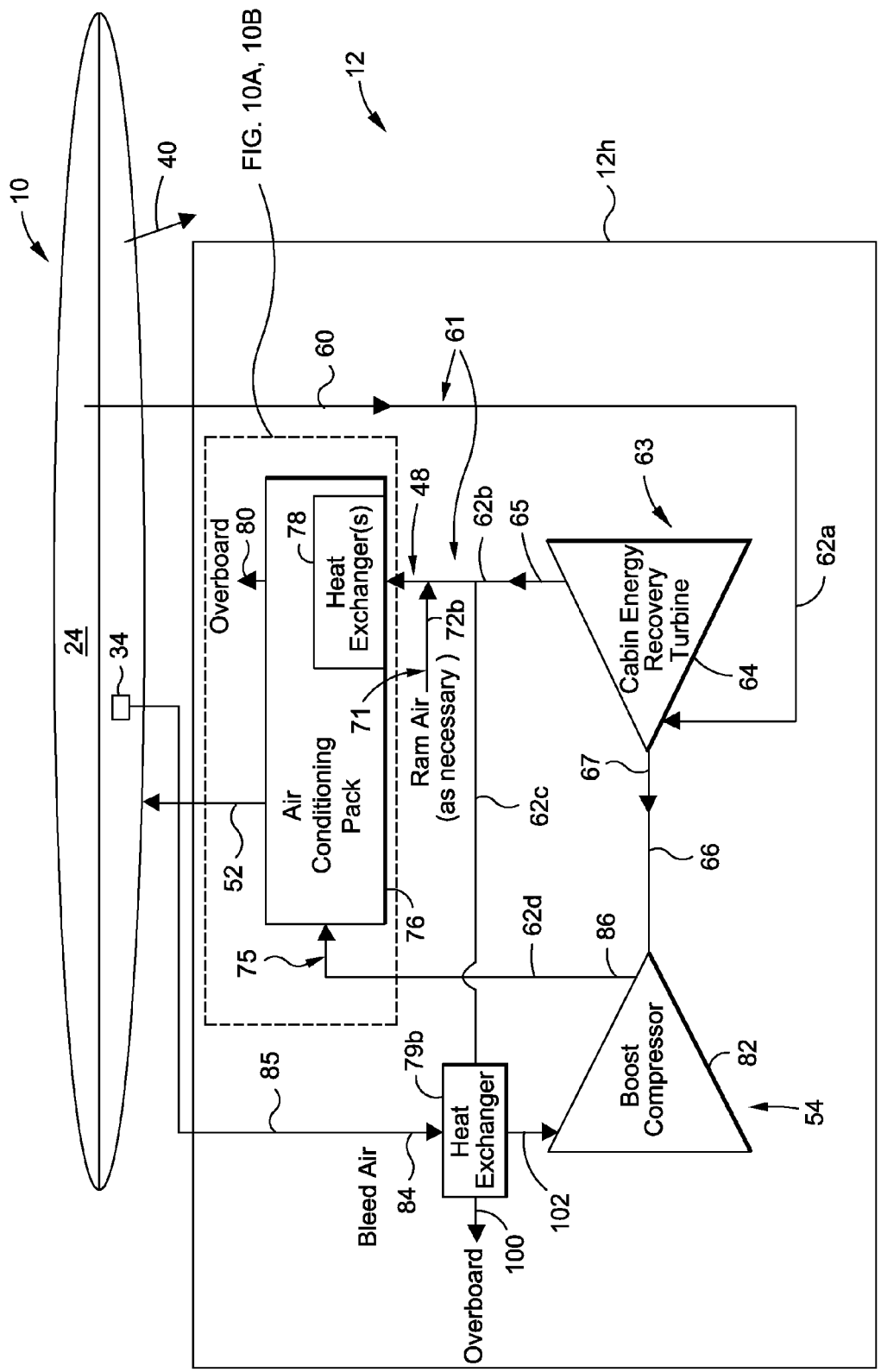
FIG. 9 is an illustration of a schematic diagram of one of the embodiments of an aircraft air conditioning system of the disclosure having a turbine that generates power to boost compressor that pressurizes bleed air flowing through a heat exchanger upstream of the boost compressor.

FIG. 9 is an illustration of a schematic diagram of another one of the embodiments of an aircraft air conditioning system 12, such as in the form of aircraft air conditioning system 12h. The aircraft air conditioning system 12, such as in the form of aircraft air conditioning system 12h, is similar to the aircraft air conditioning system 12g of FIG. 8, except that instead of using ram air 72a and a cabin compressor 70 powered with an electric motor 68, this embodiment uses bleed air 84 and a boost compressor 82. The aircraft air conditioning system 12, such as in the form of aircraft air conditioning system 12h, has the heat exchanger 79b (see FIG. 9) positioned upstream of the boost compressor 82. The heat exchanger 79b is preferably connected to duct 62b via duct 62c (see FIG. 9). In this embodiment, some of the turbine outflow air 65 may be used to pre-cool the bleed air 84 via the heat exchanger 79b before it is compressed by the boost compressor 82 for use in cabin air conditioning, ventilation, and pressurization. This embodiment may also be beneficial in high aircraft speed applications such as supersonic aircraft where bleed air 84 may be hotter than in subsonic or commerical aircraft.

As further shown in FIG. 9, similar to the embodiment of FIG. 8 and as discussed above, the aircraft air conditioning system 12, such as in the form of aircraft air conditioning system 12h, comprises the duct system 61 having at least one duct 62a connected to the aircraft cabin 24 of the aircraft 10. As shown in FIG. 9, the duct system 61 further comprises ducts 62b, 62c and 62d. The at least one duct 62a flows the pressurized cabin outflow air 60 (see FIG. 9) from the aircraft cabin 24. The aircraft air conditioning system 12, such as in the form of aircraft air conditioning system 12h, further comprises the turbine 63 (see FIG. 9) connected to the at least one duct 62a. The turbine 63 is preferably a cabin energy recovery turbine 64 (see FIG. 9). The turbine 63 receives the pressurized cabin outflow air 60 and expands the pressurized cabin outflow air 60 through the turbine 63. The turbine 63 generates turbine outflow air 65 (see FIG. 9) and further extracts extracted energy 77 (see FIG. 11A) from the pressurized cabin outflow air 60 to generate power 67 (see FIG. 9). As shown in FIG. 9, the aircraft air conditioning system 12, such as in the form of aircraft air conditioning system 12h, further comprises a boost compressor 82 that uses bleed air 84 pre-cooled with the turbine outflow air 65 via the heat exchanger 79b, and an air conditioning pack 76 having one or more heat exchanger(s) 78, and preferably having two heat exchangers 78, such as first heat exchanger 78a and second heat exchanger 78b. The aircraft air conditioning system 12h, as shown in FIG. 9, uses bleed air 84, pre-cooled bleed air 102, and does not use an electric motor, and is thus a bleed air 84 (compressed air) based system.

As further shown in FIG. 9, the aircraft air conditioning system 12, such as in the form of aircraft air conditioning system 12*h*, further comprises at least one shaft 66 connected to the turbine 63. The shaft 66 is driven by the pressurized cabin outflow air 60 and the power 67 generated from the turbine 63. The shaft 66 is configured to generate energy to power one or more aircraft air conditioning system components 54 (see FIG. 9) and/or aircraft subsystems 36 (see FIG. 6). For example, the driving of the shaft 66 using the power 67 generated from the turbine 63 may be used to directly power or augment or assist the power supplied to one or more aircraft air conditioning system components 54 (see FIG. 9), such as the boost compressor 82. Thus, the aircraft air conditioning system 12, such as in the form of aircraft air conditioning system 12*h*, augments the electrical power and may achieve the required performance of the aircraft 10 without having to increase the electrical power generation and distribution systems to the aircraft 10.

As further shown in FIG. 9, the turbine outflow air 65 generated by the turbine 63 may be mixed with the ambient air source (e.g., outside air) 71, such as in the form of ram air 72*b*, as necessary to take from ambient, to reduce mass flow of the ambient air source 71, such as in the form of ram air 72*b*, thus minimizing any associated ram system drag. The turbine outflow air 65 may be mixed with the ambient air source 71, such as in the form of ram air 72*b*, to act as a cold heat sink for the aircraft air conditioning system 12, such as in the form of aircraft air conditioning system 12*h*, for subsonic aircraft such as commercial aircraft. The addition of the turbine outflow air 65 to the ambient air source 71, such as in the form of ram air 72*b*, may also provide the necessary heat sink capacity at high aircraft speeds (beyond Mach 1.0) for high speed or supersonic aircraft or lower secondary power available conditions, as high speed or supersonic aircraft typically have much hotter ram air than subsonic aircraft. The reduced temperature cabin outflow air 48 (see FIG. 9) may comprise the turbine outflow air 65 mixed with the ambient air source (e.g., outside air) 71, such as in the form of ram air 72*b*.

As further shown in FIG. 9, the bleed air 84 is pre-cooled by the heat exchanger 79*b*. A bleed air duct 85 (see FIG. 9) is connected between the heat exchanger 79*b* and the aircraft engine compressor 34 (see FIG. 9) of the aircraft 10 and the bleed air duct 85 supplies bleed air 84 from the aircraft engine compressor 34 to the boost compressor 82 via the heat exchanger 79*b*. The turbine outflow air 65 flows through duct 62*c* (see FIG. 9) and through the heat exchanger 79*b*, which is a cross flow heat exchanger. The turbine outflow air 65 pre-cools air, such as the bleed air 84, via the heat exchanger 79*b* prior to the air, such as the bleed air 84, being compressed by the boost compressor 82. A pre-cooled bleed air 102 (see FIG. 9) flows out of the heat exchanger 79*b* and into the boost compressor 82 to be compressed. A cold side air flow 100 (see FIG. 9) flows out of the heat exchanger 79*b* and is exhausted overboard and out of the aircraft 10. The boost compressor 82 generates a boost compressor discharge air 86 (see FIG. 9) that flows through duct 62*d* and is received by the air conditioning pack 76 as a compressed inlet air stream 75 for cooling and conditioning. The compressed inlet air stream 75, such as in the form of boost compressor discharge air 86, is received and cooled by the air conditioning pack 76, and the air conditioning pack 76 generates a conditioned outflow air 52 (see FIG. 9) that then flows to the aircraft cabin 24. The conditioned outflow air 52 (see FIGS. 1, 9) flows into the aircraft cabin 24 and mixes with the cabin air 50 (see FIG. 1). Leakage and outflow air 40 (see FIGS. 1, 9) through the leakage and outflow air valves 38 (see FIG. 1) and out of the aircraft 10. As further shown in FIG. 9, the turbine outflow air 65 that is mixed with the ambient air source (e.g., outside air) 71, such as in the form of ram air 72*b*, flows through duct 62*b*, is received by the air conditioning pack 76, is preferably received by the one or more heat exchangers 78, such as first heat exchanger 78*a* (see FIG. 11B) and second heat exchanger 78*b* (see FIG. 11B), is conditioned through the air conditioning pack 76, and then flows overboard as an exhaust outflow air 80.

In another embodiment, there is provided an aircraft 10 (see FIG. 1) having an embodiment of an aircraft air conditioning system 12, 12*a*-12*h* providing expanded air conditioning and thermal management performance. As shown in FIG. 1, the aircraft 10 comprises a fuselage 14 and an aircraft cabin 24 disposed within the fuselage 14. The aircraft 10 may comprise a pair of wings 16 operatively coupled to the fuselage 14. The aircraft 10 further comprises the aircraft air conditioning system 12, 12*a*-12*h* disposed within the fuselage 14. The aircraft 10 may comprise an aircraft 10 that travels in excess of Mach 1.0 without the use of fuel as a heat sink. The aircraft air conditioning system 12, 12*a*-12*h* comprises a duct 62*a* (see FIGS. 2-9) connected to the aircraft cabin 24 and configured to flow pressurized cabin outflow air 60 from the aircraft cabin 24. The aircraft air conditioning system 12, 12*a*-12*h* further comprises a turbine 63 connected to the duct 62*a*. The turbine 63 is configured to reduce the temperature of the pressurized cabin outflow air 60 and to generate power 67 (see FIGS. 11A, 11B). The aircraft air conditioning system 12, 12*a*-12*h* further comprises a compressor 69 (see FIGS. 11A, 11B) configured to generate a compressed inlet air stream 75 (see FIGS. 11A, 11B). The aircraft air conditioning system 12, 12*a*-12*h* further comprises an air conditioning pack 76. The air conditioning pack 76 is configured to receive a reduced temperature cabin outflow air 48 (see FIGS. 11A, 11B) from the turbine 63 and is configured to receive the compressed inlet air stream 75 from the compressor 69 (see FIGS. 11A, 11B). The air conditioning pack 76 comprises a cooling cycle system 110 (see FIGS. 11A, 11B), a humidity control system 112 (see FIGS. 11A, 11B), and one or more heat exchanger(s) 78 (see FIG. 11A), preferably one or more ram heat exchangers, such as a first heat exchanger 78*a* (see FIG. 11B) and a second heat exchanger 78*b* (see FIG. 11B). The one or more heat exchanger(s) 78 are configured to use the reduced temperature cabin outflow air 48 as a heat sink 104 (see FIGS. 11A, 11B). The first heat exchanger 78*a* may be configured to reduce the heat of the compressed inlet air stream 75 (see FIGS. 11A, 11B) using the reduced temperature cabin outflow air 48 (see FIGS. 11A, 11B), wherein the compressed inlet air stream 75 is compressed using a compressor 69 (see FIGS. 11A, 11B) that may be powered in whole or in part by the turbine 63, and the second heat exchanger 78*b* (see FIG. 11B) may be configured to reduce the heat of a transport fluid 108 (see FIGS. 10A, 10B) flowing through the air conditioning pack 76.

As discussed above, FIG. 11A is an illustration of a functional block diagram of one of the embodiments of an aircraft 10*a* that may include embodiments of the air conditioning system 12. As shown in FIG. 11A, the aircraft 10, in the form of aircraft 10*a*, comprises an aircraft cabin 24, a duct 62*a*, and an aircraft air conditioning system 12. As shown in FIG. 11A, the duct 62*a* flows pressurized cabin outflow air 60 from the aircraft cabin 24 to the turbine 63 of the aircraft air conditioning system 12. As shown in FIG.

11A, the aircraft air conditioning system 12 comprises the turbine 63, a compressor 69, and an air conditioning pack 76. As shown in FIG. 11A, the turbine 63 extracts an extracted energy 77 from the pressurized cabin outflow air 60 and generates power 67 to power or assist in powering the compressor 69. As shown in FIG. 11A, the turbine 63 further generates a reduced temperature cabin outflow air 48 that is cold and is received by the air conditioning pack 76. As shown in FIG. 11A, the compressor 69 generates an air source 46 comprised of a compressed inlet air stream 75 that is also received by the air conditioning pack 76. As discussed above, and as shown in FIG. 11A, the air conditioning pack 76 comprises one or more heat exchanger(s) 78, a cooling cycle system 110, a humidity control system 112, and a heat sink 104.

In one embodiment, the compressor 69 (see FIG. 11B) may comprise a cabin compressor 70 (see FIG. 2) connected to a ram air duct 73 (see FIG. 2). The cabin compressor 70 may be configured to receive ram air 72a (see FIG. 2) from an ambient air source 71 (see FIG. 2) and configured to compress and flow the ram air 72a as a compressed inlet air stream 75 (see FIG. 2) to the air conditioning pack 76. In another embodiment, the compressor 69 (see FIG. 11B) may comprise a boost compressor 82 (see FIG. 4) connected to a bleed air duct 85 (see FIG. 4) connected to an aircraft engine compressor 34 (see FIG. 4) on an aircraft 10. The boost compressor 82 may be configured to receive bleed air 84 (see FIG. 4) from the aircraft engine compressor 34 and configured to compress and flow the bleed air 84 as a compressed inlet air stream 75 (see FIG. 4) to the air conditioning pack 76 (see FIG. 4). In another embodiment, the compressor 69 (see FIG. 11B) may comprise an aircraft engine compressor 34 (see FIG. 6) on an aircraft 10 connected to a duct system 61 (see FIG. 6), such as including duct 62e (see FIG. 6) connected to the air conditioning pack 76. The aircraft engine compressor 34 may be configured to compress and flow an aircraft supply air 90 (see FIG. 6) as a compressed inlet air stream 75 (see FIG. 6) to the air conditioning pack 76. The aircraft air conditioning system 12 may further comprise a shaft 66 connecting the turbine 63 to either a compressor 69 (see FIG. 11B) or an electric generator 88 (see FIG. 11B). The compressor 69 (see FIG. 11B) may be powered in whole or in part by the turbine 63.

As discussed above, FIG. 11B is an illustration of a functional block diagram of another embodiment of an aircraft 10b that may include embodiments of the air conditioning system 12. As shown in FIG. 11B, the aircraft 10, in the form of aircraft 10b, comprises aircraft subsystems 36, an aircraft cabin 24, a duct 62a, and an aircraft air conditioning system 12. As shown in FIG. 11B, the duct 62a flows pressurized cabin outflow air 60 from the aircraft cabin 24 to the turbine 63 of the aircraft air conditioning system 12. As shown in FIG. 11B, the aircraft air conditioning system 12 comprises the turbine 63, a compressor 69, an electric generator 88, a shaft 66, a motor 68, a duct system 61, and an air conditioning pack 76. As shown in FIG. 11B, the turbine 63 extracts an extracted energy 77 from the pressurized cabin outflow air 60 and generates power 67 to power or assist in powering the compressor 69 and/or to power or assist in powering the electric generator 88. As shown in FIG. 11B, the compressor 69 within the aircraft air conditioning system 12 may comprise a cabin compressor 70 or a boost compressor 82. Outside the aircraft air conditioning system 12, compressed inlet air stream 75 may be compressed by an aircraft engine compressor 34 or ancillary compressor devices 35. The turbine 63 generates a reduced temperature cabin outflow air 48 that is cold and is received by the air conditioning pack 76. The reduced temperature cabin outflow air 48 comprises a turbine outflow air 65 that may be mixed with the ambient air source 71, such as ram air 72b. The turbine outflow air 65 may be cooled via a heat exchanger 79a and liquid coolant stream 92. The compressor 69 generates an air source 46 comprised of a compressed inlet air stream 75 that is also received by the air conditioning pack 76. As shown in FIG. 11B, the compressed inlet air stream 75 may comprise a cabin compressor discharge air 74 generated by the cabin compressor 70, a boost compressor discharge air 86 generated by the boost compressor 82, and/or aircraft supply air 90 generated by an aircraft engine compressor 34 or ancillary compressor devices 35. As discussed above, and as shown in FIG. 11B, the air conditioning pack 76 comprises one or more heat exchanger(s) 78, and preferably comprises two heat exchangers 78, such as first heat exchanger 78a and second heat exchanger 78b, a cooling cycle system 110, a humidity control system 112, and a heat sink 104.

As shown in FIGS. 2-9, the aircraft air conditioning system 12 comprises at least one duct 62a connected to an aircraft cabin 24 where the at least one duct 62a flows pressurized cabin outflow air 60 from the aircraft cabin 24 of the aircraft 10. As further shown in FIGS. 2-9, the aircraft air conditioning system 12 further comprises a turbine 63 connected to the at least one duct 62a where the turbine 63 receives the pressurized cabin outflow air 60 and generates turbine outflow air 65 and extracts extracted energy 77 (see FIG. 11A) from the pressurized cabin outflow air 60 to generate power 67 (see FIGS. 2-9).

As further shown in FIGS. 2-9, the aircraft air conditioning system 12 further comprises at least one shaft 66 connected to the turbine 63, where the at least one shaft 66 is driven by the pressurized cabin outflow air 60 and the extracted energy 77 to augment or generate power 67 to one or more aircraft air conditioning system components 54. The at least one shaft 66 is preferably configured to generate energy to power one or more aircraft subsystems 36 (see FIG. 6), such as one or more aircraft air conditioning system components 54 (see FIGS. 2-9). As discussed in detail above, the one or more aircraft air conditioning system components 54 (see FIG. 2) of the aircraft air conditioning system 12 may comprise a cabin compressor 70 (see FIG. 2) that uses ram air 72a (see FIG. 2) and an electric motor 68 (see FIG. 2), where both the cabin compressor 70 and the electric motor 68 are connected to the at least one shaft 66 (see FIG. 2). In addition, the one or more aircraft air conditioning system components 54 (see FIG. 4) may comprise a boost compressor 82 (see FIG. 4) that uses bleed air 84 (see FIG. 4) from an aircraft engine compressor 34 (see FIG. 1), where the boost compressor 82 is connected to the at least one shaft 66 (see FIG. 4). In addition, the one or more aircraft air conditioning system components 54 (see FIG. 6) may comprise an electric generator 88 (see FIG. 6) connected to the at least one shaft 66 (see FIG. 6). Further, the one or more aircraft air conditioning system components 54 may comprise another suitable aircraft air conditioning system component 54. The aircraft air conditioning system 12 may be a ram air 72a (see FIG. 2) or a bleed air 84 (compressed air) (see FIG. 4) based system.

The aircraft air conditioning system 12 further comprises an air conditioning pack 76 (see FIGS. 2-9) having one or more heat exchanger(s) 78, and preferably two heat exchangers 78, such as first heat exchanger 78a and second heat exchanger 78b (see FIGS. 2-9), connected to the turbine 63 via duct 62b. The aircraft air conditioning system 12 may further comprise one or more heat exchangers such as heat exchanger 79a, for example, an air to liquid heat exchanger (see FIG. 3) and heat exchanger 79b, for example, an air to air heat exchanger (see FIG. 8). The aircraft air conditioning system 12 may be a ram air 72a (see FIG. 2) or a bleed air 84 (compressed air) (see FIG. 4) based system.

Figure 12:
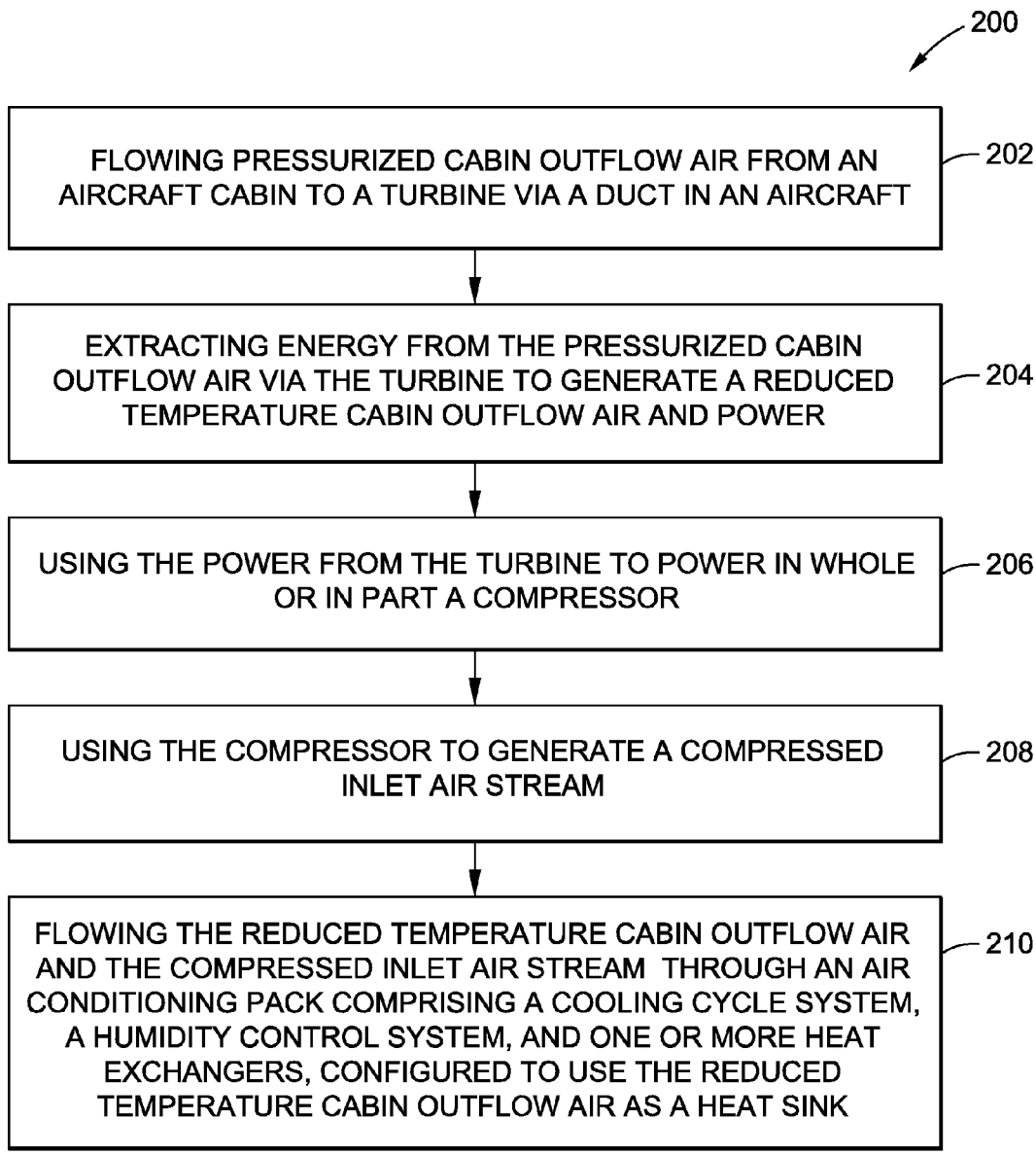

In another embodiment, there is provided a method 200 for air conditioning an aircraft 10 (see FIG. 1) that is pressurized. FIG. 12 is an illustration of a flow diagram showing an embodiment of the method 200 of the disclosure. As shown in FIG. 12, the method 200 comprises step 202 of flowing pressurized cabin outflow air 60 (see FIGS. 2-9) from an aircraft cabin 24 (see FIGS. 2-9) to a turbine 63 (see FIGS. 2-9) via a duct 62a (see FIGS. 2-9) in an aircraft air conditioning system 12, 12a-12h (see FIGS. 2-9) of an aircraft 10 (see FIGS. 1-9, 11A-11B).

As shown in FIG. 12, the method 200 further comprises step 204 of extracting energy from the pressurized cabin outflow air 60 via the turbine 63 to generate a reduced temperature cabin outflow air 48 (see FIGS. 11A, 11B) and power 67 (see FIGS. 11A, 11B). The reduced temperature cabin outflow air 48 preferably comprises a mixture of turbine outflow air 65 (see FIGS. 2-9) and an ambient air source 71, such as ram air 72b (see FIGS. 2-9). The power 67 preferably comprises shaft horsepower or another suitable power or energy.

As shown in FIG. 3, the method 200 may further comprise ducting the reduced temperature cabin outflow air 48 to at least one heat exchanger 79a (see FIG. 3), such as an air to liquid heat exchanger, and aiding in reducing heat of at least one liquid coolant stream 92 (see FIG. 3) flowing through the at least one heat exchanger 79a, such as the air to liquid heat exchanger. As shown in FIG. 8, the method 200 may further comprise ducting the reduced temperature cabin outflow air 48 to at least one heat exchanger 79b, such as an air to air heat exchanger, positioned upstream of the compressor 69 (see FIG. 11A), such as cabin compressor 70, and aiding in reducing heat of ram air 72a from an ambient air source 71 entering the compressor 69 (see FIG. 11A), such as cabin compressor 70.

The turbine outflow air 65 is used to aid in air conditioning and thermal management of the aircraft 10. In embodiments, such as, for example, shown in FIGS. 2, 4, 6, the turbine outflow air 65 may be mixed with the ambient air source (e.g., outside air) 71, such as in the form of ram air 72b, to minimize a ram system drag. In embodiments, such as, for example, shown in FIGS. 3, 5, 7, the turbine outflow air 65 may be used to reduce the temperature of a liquid coolant stream 92 to provide a reduced temperature liquid coolant stream 94 and providing a heat sink for aircraft liquid thermal management. Thus, the turbine outflow air 65 may be used to augment the ram air 72b or may be used to provide a heat sink for liquid thermal management systems. In one embodiment, such as for example shown in FIG. 8, the turbine outflow air 65 pre-cools ram air 72a via a heat exchanger 79b, such as the air to air heat exchanger, positioned prior to the ram air 72a being compressed by a cabin compressor 70 (see FIG. 8). In another embodiment, such as, for example, shown in FIG. 9, the turbine outflow air 65 pre-cools bleed air 84 prior to the bleed air 84 being compressed by a boost compressor 82. The turbine outflow air 65 may be mixed with the ambient air source 71, such as in the form of ram air 72b, to augment the ram air 72b or may be used to provide a heat sink for liquid thermal management systems.

As shown in FIG. 12, the method 200 further comprises step 206 of using the power 67 from the turbine 63 to power in whole or in part, or in other words, power or assist in powering, a compressor 69 (see FIGS. 11A, 11B). The compressor 69 may comprise a cabin compressor 70 (see FIG. 11B), a boost compressor 82 (see FIG. 11B), an aircraft engine compressor 34 (see FIG. 11B), ancillary compressor devices 35 (see FIG. 11B), or another suitable compressor device. In one embodiment, the cabin compressor 70 (see FIG. 2) uses ram air 72a (see FIG. 2) and an electric motor 68 (see FIG. 2). Both the cabin compressor 70 and the electric motor 68 are preferably connected to at least one shaft 66 (see FIG. 2). In another embodiment, the boost compressor 82 (see FIG. 4) uses bleed air 84 (see FIG. 4) from an aircraft engine compressor 34 (see FIGS. 1, 4). The boost compressor 82 is preferably connected to the shaft 66 (see FIG. 4). In another embodiment, the power 67 from the turbine 63 may be used to power in whole or in part, or in other words, power or assist in powering, an electric generator 88 (see FIG. 6) connected to the shaft 66. The electric generator 88 may augment power to one or more aircraft subsystems 36 (see FIG. 1) on the aircraft 10 (see FIG. 1).

As shown in FIG. 12, the method 200 further comprises step 208 of using the compressor to generate a compressed inlet air stream 75 (see FIGS. 11A, 11B). The compressed inlet air stream 75 is an air source 46 (see FIGS. 11A, 11B) comprising cabin compressor discharge air 74 (see FIG. 3), boost compressor discharge air 86 (see FIG. 4), aircraft supply air 90 (see FIG. 6) or another suitable compressed air source.

As shown in FIG. 12, the method 200 further comprises step 210 of flowing the reduced temperature cabin outflow air 48 and the compressed inlet air stream 75 into an air conditioning pack 76 (see FIGS. 2-11B). Preferably, the air conditioning pack 76 comprises a cooling cycle system 110 (see FIGS. 10A, 10B, 11A, 11B), a humidity control system 112 (see FIGS. 10A, 10B, 11A, 11B), and one or more heat exchangers 78 (see FIGS. 10A, 10B, 11A, 11B) configured to use the reduced temperature cabin outflow air 48 as a heat sink 104 (see FIGS. 11A-11B). The one or more heat exchangers 78 may comprise ram air heat exchangers, such as in the form of first heat exchanger 78a (see FIGS. 10A, 10B, 11B) and second heat exchanger 78b (see FIGS. 10A, 10B, 11B). The method 200 may further comprise using the one or more heat exchangers 78 to aid in reducing heat of the compressed inlet air stream 75 using the reduced temperature cabin outflow air 48 and using the one or more heat exchangers 78 to aid in reducing heat of at least one transport fluid 108 (see FIGS. 10A-10B) flowing through the air conditioning pack 76.

The air conditioning pack 76 is preferably configured to condition and cool the compressed inlet air stream 75 to be supplied to the aircraft cabin 24 using the reduced temperature cabin outflow air 48. The air conditioning pack 76 is configured to receive the reduced temperature cabin outflow air 48 from the turbine 63 and is configured to receive the compressed inlet air stream 75 from the compressor 69 (see FIGS. 11A, 11B). In particular, preferably, the first heat exchanger 78a is configured to cool the compressed inlet air stream 75 using the reduced temperature cabin outflow air 48, wherein the compressed inlet air stream 75 is compressed using the compressor 69 powered in whole or in part by the turbine 63, and the second heat exchanger 78b is preferably configured to cool a transport fluid 108 (see FIGS. 10A, 10B).

The method 200 may further comprise connecting at least one shaft 66 between the turbine 63 and either the compressor 69 (see FIG. 11B) or an electric generator 88 (see FIG. 11B). The method 200 may further comprise driving the at least one shaft 66 (see FIGS. 2-9) connected to the turbine 63 and powering in whole or in part one or more aircraft subsystems 36 (see FIG. 6) or aircraft air conditioning system components 54 (see FIGS. 2-9). The at least one shaft 66 is preferably configured to generate energy to power the one or more aircraft subsystems 36 (see FIGS. 2-9), such as one or more aircraft air conditioning system components 54 (see FIGS. 2-9). As discussed in detail above, the one or more aircraft air conditioning system components 54 (see FIG. 2) of the aircraft air conditioning system 12 may comprise various components shown in FIGS. 2-9.

In embodiments, such as for example shown in FIGS. 2, 3, driving at least one shaft 66 may comprise driving at least one shaft 66 connected to the turbine 63 to power in whole or in part a cabin compressor 70 (see FIGS. 2, 3) that uses ram air 72a (see FIGS. 2, 3) and an electric motor 68 (see FIGS. 2, 3). Both the cabin compressor 70 and the electric motor 68 are connected to the at least one shaft 66 (see FIG. 2).

In embodiments, such as for example shown in FIGS. 4, 5, driving at least one shaft 66 comprises driving at least one shaft 66 connected to the turbine 63 to power a boost compressor 82 (see FIG. 4) that uses bleed air 84 (see FIG. 4) from an aircraft engine compressor 34 (see FIG. 4). The boost compressor 82 is connected to the at least one shaft 66 (see FIG. 4).

In embodiments, such as, for example, shown in FIGS. 6, 7, driving at least one shaft 66 comprises driving at least one shaft 66 connected to the turbine 63 to power an electric generator 88 (see FIG. 6) connected to the at least one shaft 66. The electric generator 88 augments power to one or more aircraft electrical power systems 36 (see FIG. 6) on the aircraft 10 (see FIG. 6).

The method 200 may further comprise connecting one or more heat exchanger(s) 78 (see FIG. 11A), and preferably connecting two heat exchangers 78, such as first heat exchanger 78a (see FIG. 11B) and second heat exchanger 78b (see FIG. 11B), within the air conditioning pack 76 via the duct system 61 (see FIGS. 3, 8, for example), and connecting one or more heat exchangers 79a, 79b via the duct system 61 (see FIGS. 3, 8, for example).

Disclosed embodiments of the aircraft air conditioning systems 12, 12a-12h (see FIGS. 2-9) and method 200 (see FIG. 12) provide a means of minimizing the continuous power required for air conditioning and pressurization functions and provide expanded air conditioning and thermal management performance beyond that which would normally be possible given secondary power extraction limits. In addition, disclosed embodiments of the aircraft air conditioning systems 12, 12a-12h, and method 200 utilize power stored in the aircraft 10 (see FIG. 1) (as pressurized air) to supplement the secondary power extraction deficiency and provide cool air that may be used in a number of different ways to improve overall airplane efficiency (e.g., supplementing ram air 72b (see FIG. 2) resulting in reduced drag, providing a cooling source such as a reduced temperature liquid coolant stream 94 (see FIG. 3) for liquid thermal management systems). This may be particularly beneficial when the available secondary power is limited to levels below which a known aircraft that does not employ the aircraft air conditioning system 12 and method 200 would not achieve the required performance.

Moreover, disclosed embodiments of the aircraft air conditioning systems 12, 12a-12h (see FIGS. 2-9) and method 200 (see FIG. 12) may provide air conditioning and thermal management of supersonic high speed aircraft that travel in excess of Mach 1.0 without the use of fuel as a heat sink. Thus, disclosed embodiments of the aircraft air conditioning systems 12, 12a-12h (see FIGS. 2-9) and method 200 may provide a viable option for compliance with regulatory requirements relating to aircraft fuel tank flammability. In addition, such supersonic high speed aircraft may benefit from the aircraft air conditioning systems 12, 12a-12h (see FIGS. 2-9), as use of the aircraft air conditioning system 12, 12a-12h (see FIGS. 2-9) may reduce the size, weight and complexity of such supersonic high speed aircraft.

Further, disclosed embodiments of the aircraft air conditioning systems 12, 12a-12h (see FIGS. 2-9) and method 200 (see FIG. 12) may provide an optimal design solution in cases where known air conditioning and pressurization power needs are in excess of the secondary power available, may provide a heat sink to aid in aircraft thermal management, may minimize the system power extraction and ram air flow needs thus providing potentially higher overall aircraft level efficiency, and may boost overall cooling performance within secondary power constraints.

Finally, use of disclosed embodiments of the aircraft air conditioning systems 12, 12a-12h (see FIGS. 2-9) and method 200 (see FIG. 12) in an aircraft 10 (see FIG. 1) may provide increased flexibility to enable a more optimum air conditioning and thermal management solution for the aircraft.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:
1. An aircraft air conditioning system comprising:
a duct in an aircraft connected to an aircraft cabin and configured to flow pressurized cabin outflow air from the aircraft cabin;
a turbine connected to the duct, the turbine configured to reduce a temperature of the pressurized cabin outflow air and to generate power and turbine outflow air;
a compressor configured to generate a compressed inlet air stream, the compressor comprising one of a cabin compressor receiving ram air from an ambient air source, a boost compressor receiving bleed air from an aircraft engine compressor, or the aircraft engine compressor supplying aircraft supply air; and,
an air conditioning pack configured to receive a reduced temperature cabin outflow air from the turbine, the reduced temperature cabin outflow air comprising a mixture of the turbine outflow air and ram air, and the air conditioning pack configured to receive the compressed inlet air stream from the compressor, the air conditioning pack comprising:
a cooling cycle system;
a humidity control system; and,
one or more heat exchangers configured to use the reduced temperature cabin outflow air as a heat sink.
2. The aircraft air conditioning system of claim 1 wherein the cabin compressor is connected to a ram air duct and is configured to compress and flow the ram air as the compressed inlet air stream to the air conditioning pack.
3. The aircraft air conditioning system of claim 1 further comprising a shaft connecting the turbine to the compressor, the shaft configured to turn the compressor when the pressurized cabin outflow air passes through the turbine.

4. The aircraft air conditioning system of claim 3 wherein the shaft connects the turbine to an electric generator instead of the compressor, the electric generator configured to generate an electrical current, and the electric generator in electrical connection with an aircraft subsystem and configured to power the aircraft subsystem.

5. The aircraft air conditioning system of claim 1 further comprising a shaft connecting the turbine to the compressor and to an electric motor therebetween, the shaft configured to turn the compressor when the pressurized cabin outflow air passes through the turbine and the electric motor configured to turn the shaft.

6. The aircraft air conditioning system of claim 1 wherein the compressor is powered in whole or in part by the turbine.

7. The aircraft air conditioning system of claim 1 wherein the compressor is a boost compressor is connected to a bleed air duct connected to the aircraft engine compressor on an aircraft, and the boost compressor is configured to compress and flow the bleed air as the compressed inlet air stream to the air conditioning pack.

8. The aircraft air conditioning system of claim 1 wherein the aircraft engine compressor is on an aircraft connected to a duct system connected to the air conditioning pack, and the aircraft engine compressor is configured to compress and flow the aircraft supply air as the compressed inlet air stream to the air conditioning pack.

9. The aircraft air conditioning system of claim 1 wherein the one or more heat exchangers comprise a first heat exchanger configured to aid in reducing heat of the compressed inlet air stream using the reduced temperature cabin outflow air, and a second heat exchanger configured to aid in reducing heat of at least one transport fluid flowing through the air conditioning pack.

10. The aircraft air conditioning system of claim 1 further comprising the reduced temperature cabin outflow air of the turbine connected to at least one air to liquid heat exchanger configured to aid in reducing heat of at least one liquid coolant stream flowing through the at least one air to liquid heat exchanger.

11. The aircraft air conditioning system of claim 1 further comprising the reduced temperature cabin outflow air of the turbine connected to at least one heat exchanger positioned upstream of the compressor, the at least one heat exchanger configured to aid in reducing heat of ram air from the ambient air source entering the compressor.

12. An aircraft having an aircraft air conditioning system providing expanded air conditioning and thermal management performance, the aircraft comprising:
 a fuselage;
 an aircraft cabin disposed within the fuselage; and,
 an aircraft air conditioning system disposed within the fuselage, the aircraft air conditioning system comprising:
  a duct connected to the aircraft cabin and configured to flow pressurized cabin outflow air from the aircraft cabin;
  a turbine connected to the duct, the turbine configured to reduce a temperature of the pressurized cabin outflow air and to generate power and turbine outflow air;
  a compressor configured to generate a compressed inlet air stream, the compressor comprising one of a cabin compressor receiving ram air from an ambient air source, a boost compressor receiving bleed air from an aircraft engine compressor, or the aircraft engine compressor supplying aircraft supply air; and,
  an air conditioning pack configured to receive a reduced temperature cabin outflow air from the turbine, the reduced temperature cabin outflow air comprising a mixture of the turbine outflow air and ram air, and the air conditioning pack configured to receive the compressed inlet air stream from the compressor, the air conditioning pack comprising:
   a cooling cycle system;
   a humidity control system; and,
   one or more heat exchangers configured to use the reduced temperature cabin outflow air as a heat sink.

13. The aircraft of claim 12 wherein the cabin compressor is connected to a ram air duct and is configured to compress and flow the ram air as the compressed inlet air stream to the air conditioning pack.

14. The aircraft of claim 12 wherein the boost compressor is connected to a bleed air duct connected to the aircraft engine compressor on the aircraft, and the boost compressor is configured to compress and flow the bleed air as the compressed inlet air stream to the air conditioning pack.

15. The aircraft of claim 12 wherein the aircraft engine compressor is on the aircraft connected to a duct system connected to the air conditioning pack, and the aircraft engine compressor is configured to compress and flow the aircraft supply air as the compressed inlet air stream to the air conditioning pack.

16. The aircraft of claim 12 wherein the aircraft air conditioning system further comprises a shaft connecting the turbine to either the compressor or an electric generator.

17. The aircraft of claim 12 wherein the compressor is powered in whole or in part by the turbine.

18. A method for air conditioning an aircraft comprising:
 flowing a pressurized cabin outflow air from an aircraft cabin to a turbine via a duct in an aircraft;
 extracting energy from the pressurized cabin outflow air via the turbine to generate power and turbine outflow air;
 mixing the turbine outflow air with ram air to generate a reduced temperature cabin outflow air;
 using the power from the turbine to power in whole or in part a compressor;
 using the compressor to generate a compressed inlet air stream, the compressor comprising one of a cabin compressor receiving ram air from an ambient air source, a boost compressor receiving bleed air from an aircraft engine compressor, or the aircraft engine compressor supplying aircraft supply air; and
 flowing the reduced temperature cabin outflow air and the compressed inlet air stream through an air conditioning pack, the air conditioning pack comprising:
  a cooling cycle system;
  a humidity control system; and
  one or more heat exchangers configured to use the reduced temperature cabin outflow air as a heat sink.

19. The method of claim 18 further comprising using the one or more heat exchangers to aid in reducing heat of the compressed inlet air stream using the reduced temperature cabin outflow air and to aid in reducing heat of at least one transport fluid flowing through the air conditioning pack.

20. The method of claim 18 further comprising connecting a shaft between the turbine and either the compressor or an electric generator.

21. The method of claim 18 further comprising ducting the reduced temperature cabin outflow air to at least one air to liquid heat exchanger, and aiding in reducing heat of at least one liquid coolant stream flowing through the at least one air to liquid heat exchanger.

22. The method of claim 18 further comprising ducting the reduced temperature cabin outflow air to at least one heat exchanger positioned upstream of the compressor, and aiding in reducing heat of ram air from the ambient air source entering the compressor.

* * * * *